United States Patent
Li et al.

(10) Patent No.: US 9,204,395 B2
(45) Date of Patent: Dec. 1, 2015

(54) APPARATUS AND METHOD FOR DISCONTINUOUS RECEIVE IN COMMUNICATION SYSTEMS WITH LARGE NUMBER OF ANTENNAS

(71) Applicant: Samsung Electronics Co., LTD, Suwon-si, Gyeonggi-do (KR)

(72) Inventors: Ying Li, Richardson, TX (US); Rakesh Taori, McKinney, TX (US); Zhouyue Pi, Allen, TX (US); Sudhir Ramakrishna, Plano, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 105 days.

(21) Appl. No.: 14/046,664

(22) Filed: Oct. 4, 2013

(65) Prior Publication Data
US 2014/0198696 A1 Jul. 17, 2014

Related U.S. Application Data

(60) Provisional application No. 61/752,825, filed on Jan. 15, 2013.

(51) Int. Cl.
*H04W 52/02* (2009.01)
*H04W 84/12* (2009.01)

(52) U.S. Cl.
CPC .......... *H04W 52/0229* (2013.01); *H04W 52/02* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 8,116,694 B2 * | 2/2012 | Kaaja et al. | 455/70 |
| 8,140,024 B2 * | 3/2012 | Prasad et al. | 455/69 |
| 8,401,542 B2 * | 3/2013 | Chung et al. | 455/423 |
| 2004/0198411 A1 | 10/2004 | Cheng et al. | |
| 2008/0192703 A1 | 8/2008 | Suzuki | |
| 2009/0238156 A1 * | 9/2009 | Yong et al. | 370/336 |
| 2009/0310503 A1 | 12/2009 | Tenny et al. | |
| 2010/0214169 A1 * | 8/2010 | Kafle | 342/368 |
| 2011/0316744 A1 * | 12/2011 | Morioka et al. | 342/367 |
| 2012/0170485 A1 * | 7/2012 | Maeda et al. | 370/252 |
| 2012/0263051 A1 * | 10/2012 | Willars et al. | 370/252 |
| 2012/0275365 A1 | 11/2012 | Anderson et al. | |

OTHER PUBLICATIONS

International Search Report dated May 20, 2014 in connection with International Patent Application No. PCT/KR2014/000353, 3 pages.
Written Opinion of International Searching Authority dated May 20, 2014 in connection with International Patent Application No. PCT/KR2014/000353, 5 pages.

* cited by examiner

*Primary Examiner* — Hong Cho

(57) ABSTRACT

A user equipment (UE) performs a method for supporting discontinuous receive (DRX) in a wireless network. The method includes waking up at a wake up time associated with a beginning of a DRX cycle, the DRX cycle comprising a plurality of subframes. The method also includes determining whether to perform receive beam training before a beginning of a time period for downlink communication. The method further includes receiving data during the time period for downlink communication.

20 Claims, 25 Drawing Sheets

Control beams B1,B2,B3,B4 carry same information

Control beams B1,B2,B3,B4 carry different information
E.g., each control beam only carries the information
related to the data beams within its coverage Beam: e.g., for data control channel beam: e.g., Unicast Data beam

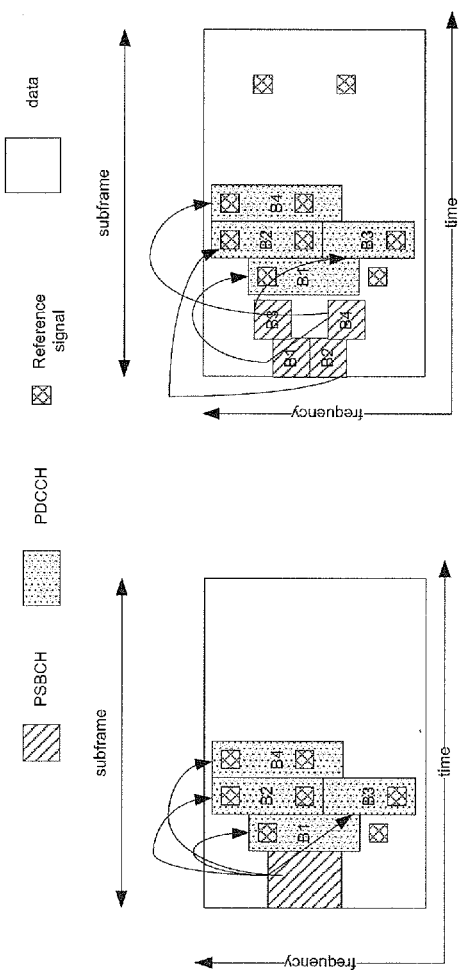
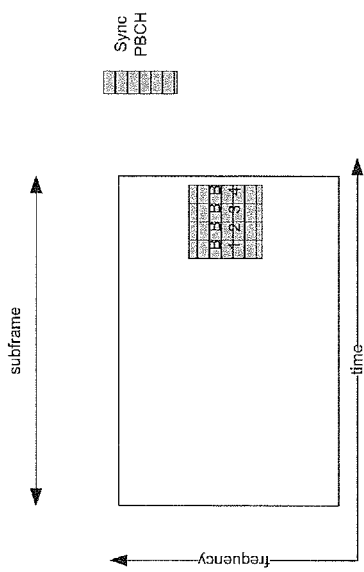
FIG. 8B
FIG. 8C
FIG. 8D

APPARATUS AND METHOD FOR DISCONTINUOUS RECEIVE IN COMMUNICATION SYSTEMS WITH LARGE NUMBER OF ANTENNAS

CROSS-REFERENCE TO RELATED APPLICATION(S) AND CLAIM OF PRIORITY

The present application claims priority to U.S. Provisional Patent Application Ser. No. 61/752,825 filed Jan. 15, 2013, entitled "DISCONTINOUS RECEIVE IN COMMUNICATION SYSTEM WITH LARGE NUMBER OF ANTENNAS". The content of the above-identified patent documents is incorporated herein by reference.

TECHNICAL FIELD

The present application relates generally to wireless communication and, more specifically, to an apparatus and method for discontinuous receive in communication systems with a large number of antennas.

BACKGROUND

Wireless communication has been one of the most successful innovations in modern history. Recently, the number of subscribers to wireless communication services exceeded five billion and continues to grow quickly. The demand of wireless data traffic is rapidly increasing due to growing popularity among, consumers and businesses of smart phones and other mobile data devices, such as tablets, "note pad" computers, net books, and eBook readers. In order to meet the high growth in mobile data traffic, improvements in radio interface efficiency and allocation of new spectrum is of paramount importance.

SUMMARY

A method for supporting discontinuous receive (DRX) by a user equipment (UE) in a wireless network is provided. The method includes waking up at a wake up time associated with a beginning of a DRX cycle, the DRX cycle comprising a plurality of subframes. The method also includes determining whether to perform receive beam training before a beginning of a time period for downlink communication. The method further includes receiving data during the time period for downlink communication.

An apparatus for use in a mobile station configured to support discontinuous receive (DRX) in a wireless network is provided. The apparatus includes at least one antenna and a processor coupled to the at least one antenna. The processor is configured to wake up at a wake up time associated with a beginning of a DRX cycle, the DRX cycle comprising a plurality of subframes, determine whether to perform receive beam training before a beginning of a time period for downlink communication, and receive data during the time period for downlink communication.

A method for supporting discontinuous receive (DRX) by a base station configured for communication with a user equipment (UE) in a wireless network is provided. The method includes instructing the UE to wake up at a wake up time associated with a beginning of a DRX cycle, the DRX cycle comprising a plurality of subframes. The method also includes instructing the UE to determine whether to perform receive beam training before a beginning of a time period for downlink communication. The method further includes transmitting data to the UE during the time period for downlink communication.

An apparatus for use in a base station configured for communication with a user equipment (UE) in a wireless network is provided. The apparatus is configured to support discontinuous receive (DRX) and includes at least one antenna and a processor coupled to the at least one antenna. The processor is configured to instruct the UE to wake up at a wake up time associated with a beginning of a DRX cycle, the DRX cycle comprising a plurality of subframes, instruct the UE to determine whether to perform receive beam training before a beginning of a time period for downlink communication, and transmit data to the UE during the time period for downlink communication.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A through 8D illustrate examples of a downlink frame structure and downlink channels, according to embodiments of this disclosure;

DETAILED DESCRIPTION

Figure 1:
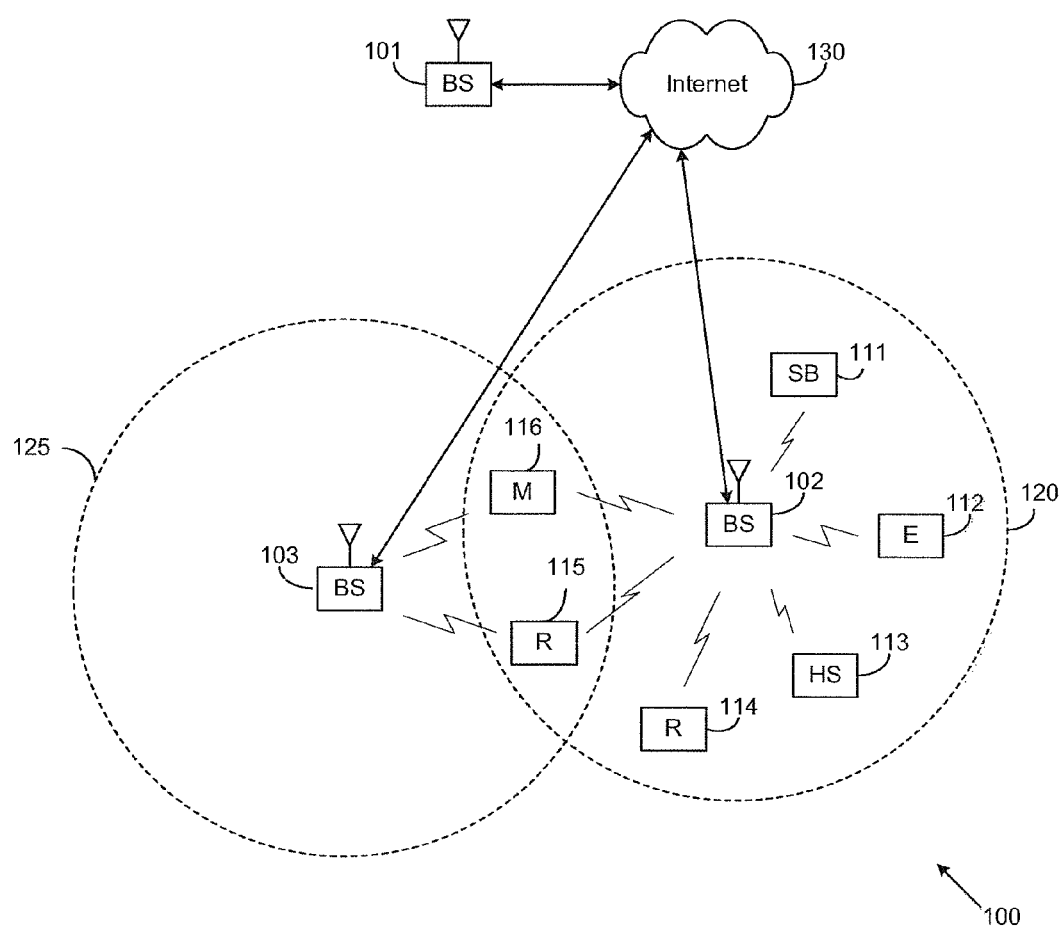
FIG. 1 illustrates a wireless communication network, according to embodiments of this disclosure.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: (i) F. Khan and Z. Pi, "MmWave Mobile Broadband (MMB): Unleashing The 3-300 GHz Spectrum", in Proc. Sarnoff Symposium, 2011 (hereinafter "REF1"); Z. Pi and F. Khan, "An Introduction To Millimeter-Wave Mobile Broadband Systems", IEEE Communication Magazine, June 2011 (hereinafter "REF2"); and Z. Pi and F. Khan, "System Design And Network Architecture For A Millimeter-Wave Mobile Broadband (MMB) System", in Proc. Sarnoff Symposium, 2011 (hereinafter "REF3").

In order to meet the high growth in mobile data traffic, improvements in radio interface efficiency are important. One important approach is to use a large number of antennas. In many cellular systems, the receiver is omnidirectional. When a receiving device returns from a discontinuous receive (DRX) mode (e.g., wakes up from the idle mode to monitor a paging message), it can utilize its omnidirectional receiver to receive the signal from the node (e.g., a base station) that is transmitting. However, for systems with a large number of antennas, directional beams can be foil led for communications. In systems that utilize directional beams, if a device uses a previously-used receive direction to receive a signal from base station, the receiver may not receive the signal. For example, the receiving (RX) pattern used right before DRX mode may no longer be useful. Thus, a device that uses multiple RX beams may need to determine which RX beam pattern to use when the device comes back from the DRX mode. Accordingly, the question is how to support DRX in communication systems with large number of antennas.

This disclosure describes methods and apparatus for discontinuous receiving in communication systems with a large number of antennas. Although embodiments of this disclosure are described in the context of communication with millimeter waves, the disclosed embodiments are also applicable in other communication mediums, e.g., radio waves with frequency of 3 GHz-30 GHz that exhibit properties similar to millimeter waves. In some cases, the disclosed embodiments are also applicable to electromagnetic waves with terahertz frequencies, infrared, visible light, and other optical media. For illustrative purposes, the terms "cellular band" and "millimeter wave band" are used herein, where "cellular band" refers to frequencies of approximately a few hundred megahertz to a few gigahertz, and "millimeter wave band" refers to frequencies of approximately a few tens of gigahertz to a few hundred gigahertz. One difference between the two is that the radio waves in cellular bands have less propagation loss and can provide superior coverage, but may require large antennas. On the other hand, radio waves in millimeter wave bands usually exhibit higher propagation loss but lend themselves well to high-gain antennas or antenna array designs in a small form factor.

The embodiments disclosed herein primarily describe communication between base stations and mobile stations (e.g., base station to mobile station transmission). Those skilled in the art will recognize that the disclosed embodiments are also applicable for communications between base stations (e.g., base station to base station transmission), and for communications between mobile stations (e.g., mobile station to mobile station communication). The embodiments disclosed herein are applicable for communication systems with large number of antennas, such as systems in MMB, RF band, and the like.

FIG. 1 illustrates a wireless communication network, according to an embodiment of this disclosure. The embodiment of wireless communication network 100 illustrated in FIG. 1 is for illustration only. Other embodiments of the wireless communication network 100 could be used without departing from the scope of this disclosure.

In the illustrated embodiment, the wireless communication network 100 includes base station (BS) 101, base station (BS)

102, base station (BS) 103, and other similar base stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of subscriber stations (also referred to herein as mobile stations) within coverage area 120 of base station 102. Throughout this disclosure, the term mobile station (MS) is interchangeable with the term subscriber station. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Each base station 101-103 can have a globally unique base station identifier (BSID). A BSID is often a MAC (media access control) ID. Each base station 101-103 can have multiple cells (e.g., one sector can be one cell), each with a physical cell identifier, or a preamble sequence, which is often carried in the synchronization channel.

While only six subscriber stations are depicted in FIG. 1, it is understood that the wireless communication network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. For example, subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
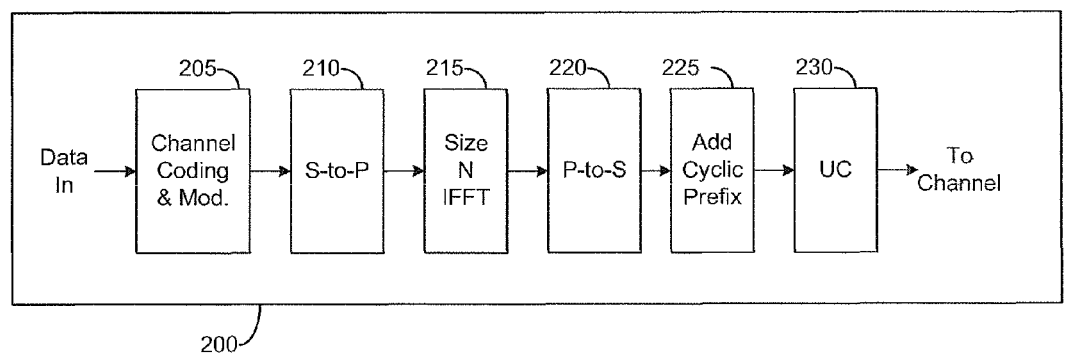
FIG. 2A is a high-level diagram of an orthogonal frequency division multiple access (OFDMA) or millimeter wave transmit path, according to embodiments of this disclosure.
Figure 2B:
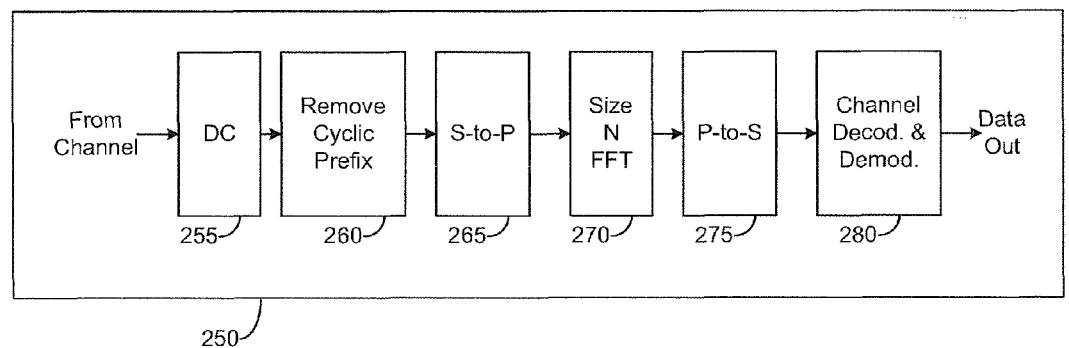
FIG. 2B is a high-level diagram of an OFDMA or millimeter wave receive path, according to embodiments of this disclosure.

FIG. 2A is a high-level diagram of an orthogonal frequency division multiple access (OFDMA) or millimeter wave transmit path, according to embodiments of this disclosure. FIG. 2B is a high-level diagram of an OFDMA or millimeter wave receive path, according to embodiments of this disclosure. In FIGS. 2A and 2B, the transmit path 200 may be implemented, e.g., in base station (BS) 102 and the receive path 250 may be implemented, e.g., in a subscriber station, such as subscriber station 116 of FIG. 1. It will be understood, however, that the receive path 250 could be implemented in a base station (e.g. base station 102 of FIG. 1) and the transmit path 200 could be implemented in a subscriber station. All or part of the transmit path 200 and the receive path 250 may comprise, or be comprised of, one or more processors.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

In an embodiment of this disclosure, a base station (BS) can have one or multiple cells, and each cell can have one or multiple antenna arrays, where each array within a cell can have different frame structures, e.g., different uplink and downlink ratios in a time division duplex (TDD) system. Multiple TX/RX (transmitting/receiving) chains can be applied in one array, or in one cell. One or multiple antenna arrays in a cell can have the same downlink control channel (e.g., synchronization channel, physical broadcast channel, and the like) transmission, while the other channels (e.g., data channel) can be transmitted in the frame structure specific to each antenna array.

The base station can use one or more antennas or antenna arrays to carry out beam forming. Antenna arrays can form beams having different widths (e.g., wide beam, narrow beam, etc.). Downlink control channel information, broadcast signals and messages, and broadcast data channels and control channels can be transmitted in wide beams. A wide beam may include a single wide beam transmitted at one time, or a sweep of narrow beams at sequential times. Multicast and unicast data and control signals and messages can be transmitted in narrow beams.

Cell identifiers can be carried in the synchronization channel. Arrays or beam identifiers can be implicitly or explicitly carried in the downlink control channels (e.g., synchronization channel, physical broadcast channel, and the like). These channels can be sent over wide beams. By acquiring these channels, the mobile station (MS) can detect the identifiers.

A mobile station (MS) can also use one or more antennas or antenna arrays to carry out beam forming. As in BS antenna arrays, antenna arrays at the MS can form beams with different widths (e.g., wide beam, narrow beam, etc.). Broadcast signals and messages, and broadcast data channels and control channels can be transmitted in wide beams. Multicast and unicast data and control signals and messages can be transmitted in narrow beams.

Figure 3A:
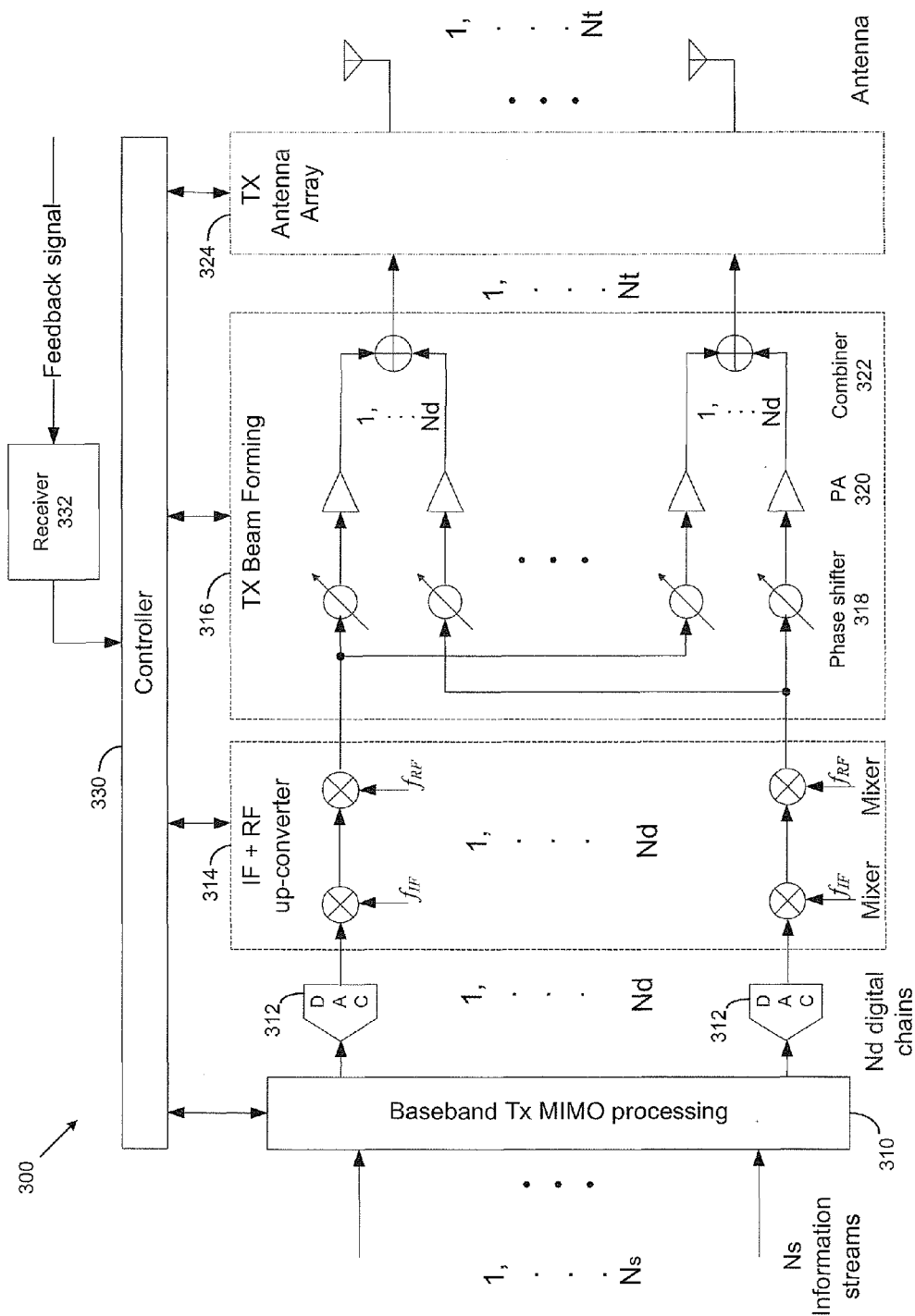
FIG. 3A illustrates a transmit path for multiple input multiple output (MIMO) baseband processing and analog beam forming with a large number of antennas, according to embodiments of this disclosure.

FIG. 3A illustrates a transmit path for multiple input multiple output (MIMO) baseband processing and analog beam fowling with a large number of antennas, according to embodiments of this disclosure. The transmit path 300 includes a beam forming architecture in which all of the signals output from baseband processing are fully connected to all the phase shifters and power amplifiers (PAs) of the antenna array.

As shown in FIG. 3A, Ns information streams are processed by a baseband processor (not shown), and input to the baseband TX MIMO processing block 310. After the baseband TX MIMO processing, the information streams are converted at a digital and analog converter (DAC) 312, and further processed by an interim frequency (IF) and radio frequency (RF) up-converter 314, which converts the baseband signal to the signal in RF carrier band. In some embodiments, one information stream can be split to I (in-phase) and Q (quadrature) signals for modulation. After the IF and RF up-converter 314, the signals are input to a TX beam forming module 316.

FIG. 3A shows one possible architecture for the beam forming module 316, where the signals are fully connected to all the phase shifters and power amplifiers (PAs) of the transmit antennas. Each of the signals from the IF and RF up-converter 314 can go through one phase shifter 318 and one PA 320, and via a combiner 322, all the signals can be combined to contribute to one of the antennas of the TX antenna array 324. In FIG. 3A, there are Nt transmit antennas in the TX array 324. Each antenna transmits the signal over the air. A controller 330 can interact with the TX modules including the baseband processor, IF and RF up-converter 314, TX beam forming module 316, and TX antenna array module 324. A receiver module 332 can receive feedback signals and the feedback signals can be input to the controller 330. The controller 330 can process the feedback signal and adjust the TX modules.

Figure 3B:
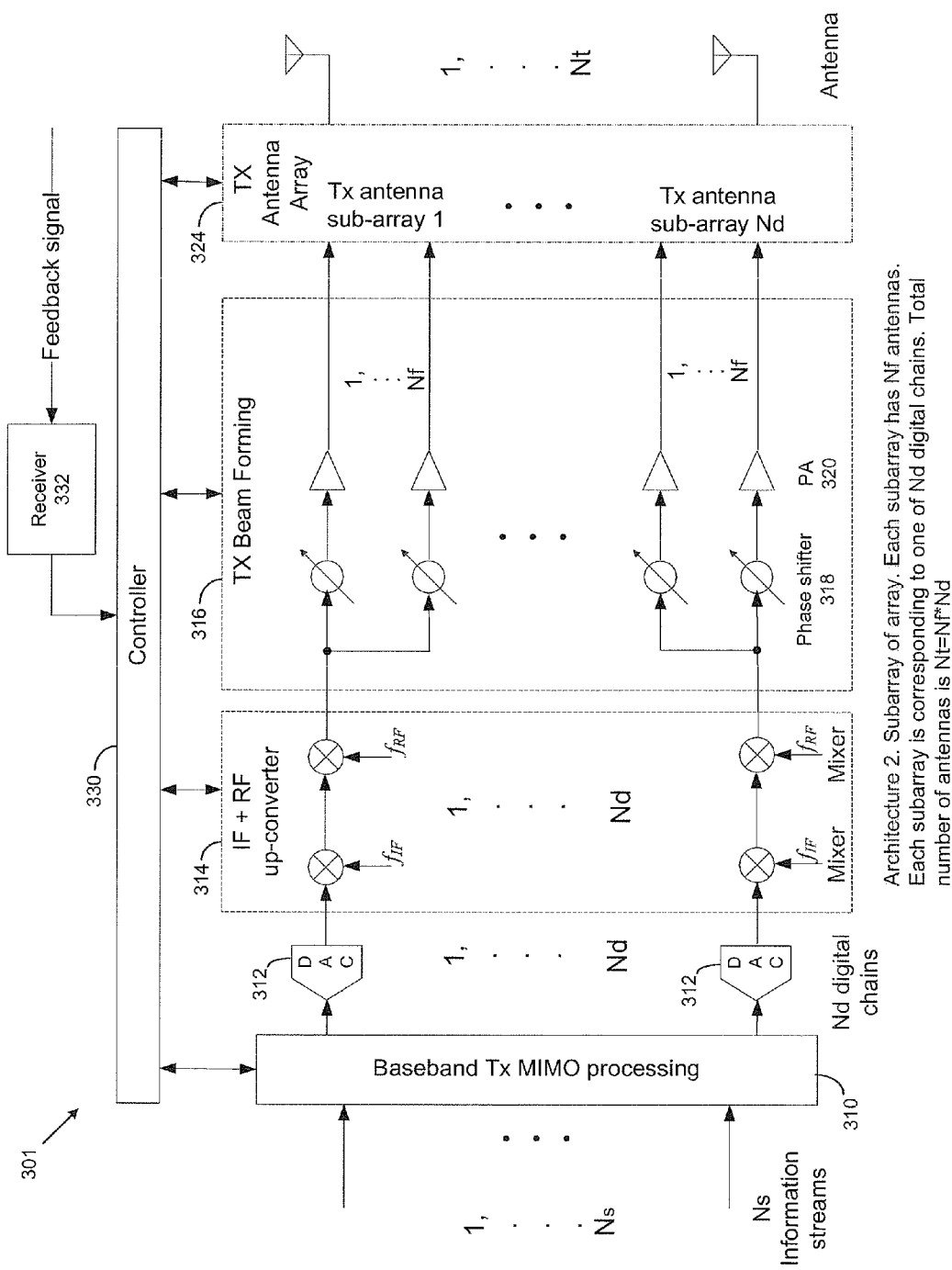
FIG. 3B illustrates another transmit path for MIMO baseband processing and analog beamforming with a large number of antennas, according to embodiments of this disclosure.

FIG. 3B illustrates another transmit path for MIMO baseband processing and analog beam forming with a large number of antennas, according to embodiments of this disclosure. The transmit path 301 includes a beam forming architecture in which a signal output from baseband processing is connected to the phase shifters and power amplifiers (PAs) of a sub-array of the antenna array. The transmit path 301 is similar to the transmit path 300 of FIG. 3A, except for differences in the beam fruiting module 316.

As shown in FIG. 3B, the signal from the baseband is processed through the IF and RF up-converter 314, and is input to the phase shifters 318 and power amplifiers 320 of a sub-array of the antenna array 324, where the sub-array has Nf antennas. For the Nd signals from baseband processing (e.g., the output of the MIMO processing), if each signal goes to a sub-array with Nf antennas, the total number of transmitting antennas Nt should be Nd*Nf. The transmit path 301 includes an equal number of antennas for each sub-array. However, the disclosure is not limited thereto. Rather, the number of antennas for each sub-array need not be equal across all sub-arrays.

The transmit path 301 includes one output signal from the MIMO processing as the input to the RF processing with one sub-array of antennas. However, this disclosure is not limited thereto. Rather, one or multiple signals out of the Nd signals from base band processing (e.g., the output of the MIMO processing) can be the inputs to one of the sub-arrays. When multiple output signals from the MIMO processing are as the inputs to one of the sub-arrays, each of the multiple output signals from the MIMO processing can be connected to part of or all of the antennas of the sub-array. For example, the RF and IF signal processing with each of the sub-array of antennas can be the same as the processing with the array of antennas as in FIG. 3A, or any type of the RF and IF signal processing with an array of antennas. The process related to one sub-array of the antennas may be referred to as one "RF chain".

Figure 3C:
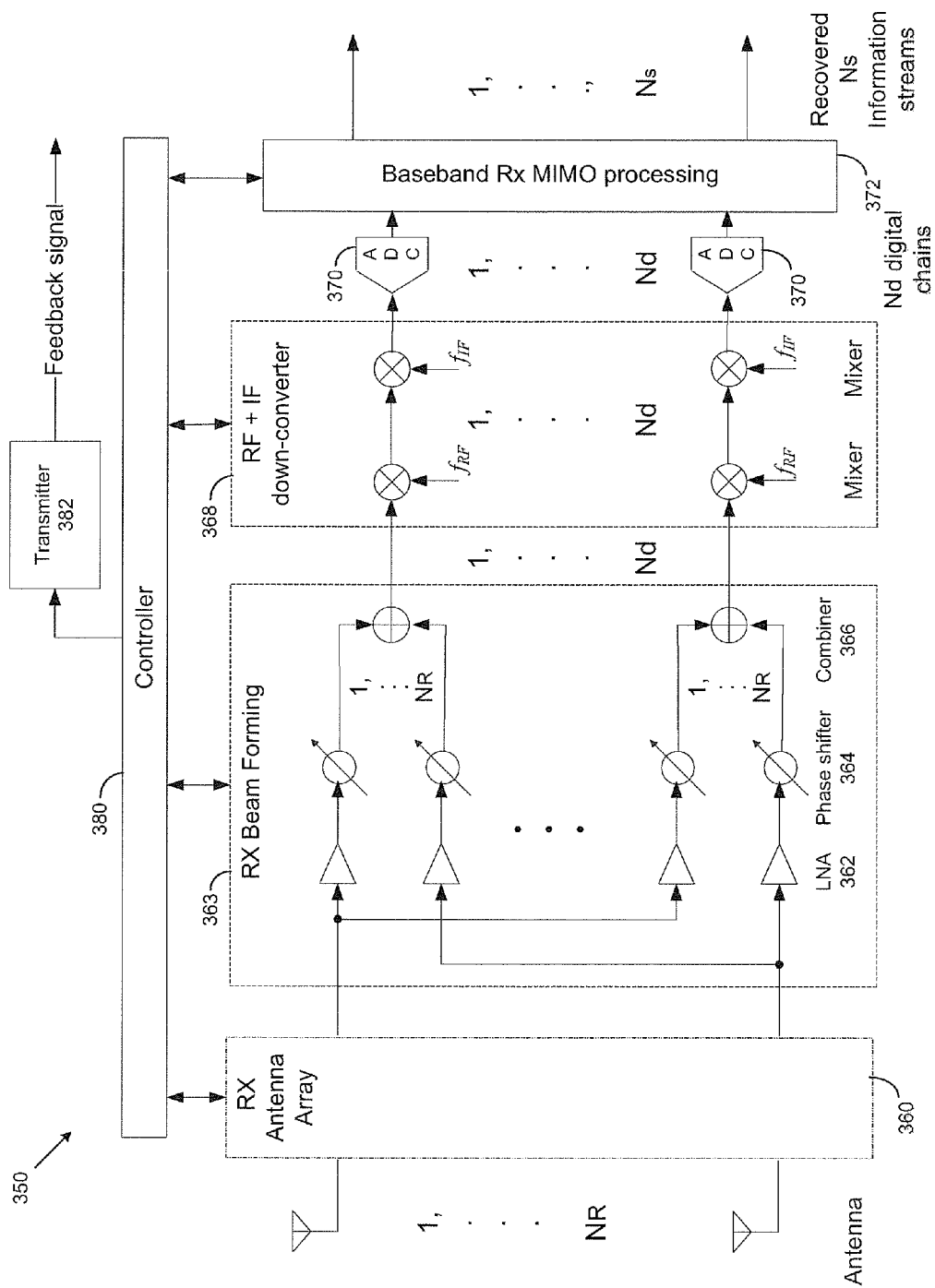
FIG. 3C illustrates a receive path for MIMO baseband processing and analog beamforming with a large number of antennas, according to embodiments of this disclosure.

FIG. 3C illustrates a receive path for MIMO baseband processing and analog beam forming with a large number of antennas, according to embodiments of this disclosure. The receive path 350 includes a beam forming architecture in which all of the signals received at the RX antennas are processed through an amplifier (e.g., a low noise amplifier (LNA)) and a phase shifter. The signals are then combined to form an analog stream that can be further converted to the baseband signal and processed in a baseband.

As shown in FIG. 3C, NR receive antennas 360 receive the signals transmitted by the transmit antennas over the air. The signals from the RX antennas are processed through the LNAs 362 and the phase shifters 364. The signals are then combined at a combiner 366 to form an analog stream. In total, Nd analog streams can be formed. Each analog stream can be further converted to the baseband signal via a RF and IF down-converter 368 and an analog to digital converter (ADC) 370. The converted digital signals can be processed in a baseband RX MIMO processing module 372 and other baseband processing, to obtain the recovered NS information streams. A controller 380 can interact with the RX modules including baseband processor, RF and IF down-converter 368, RX beam forming module 363, and RX antenna array module 360. The controller 380 can send signals to a transmitter module 382, which can send a feedback signal. The controller 380 can adjust the RX modules and determine and form the feedback signal.

Figure 3D:
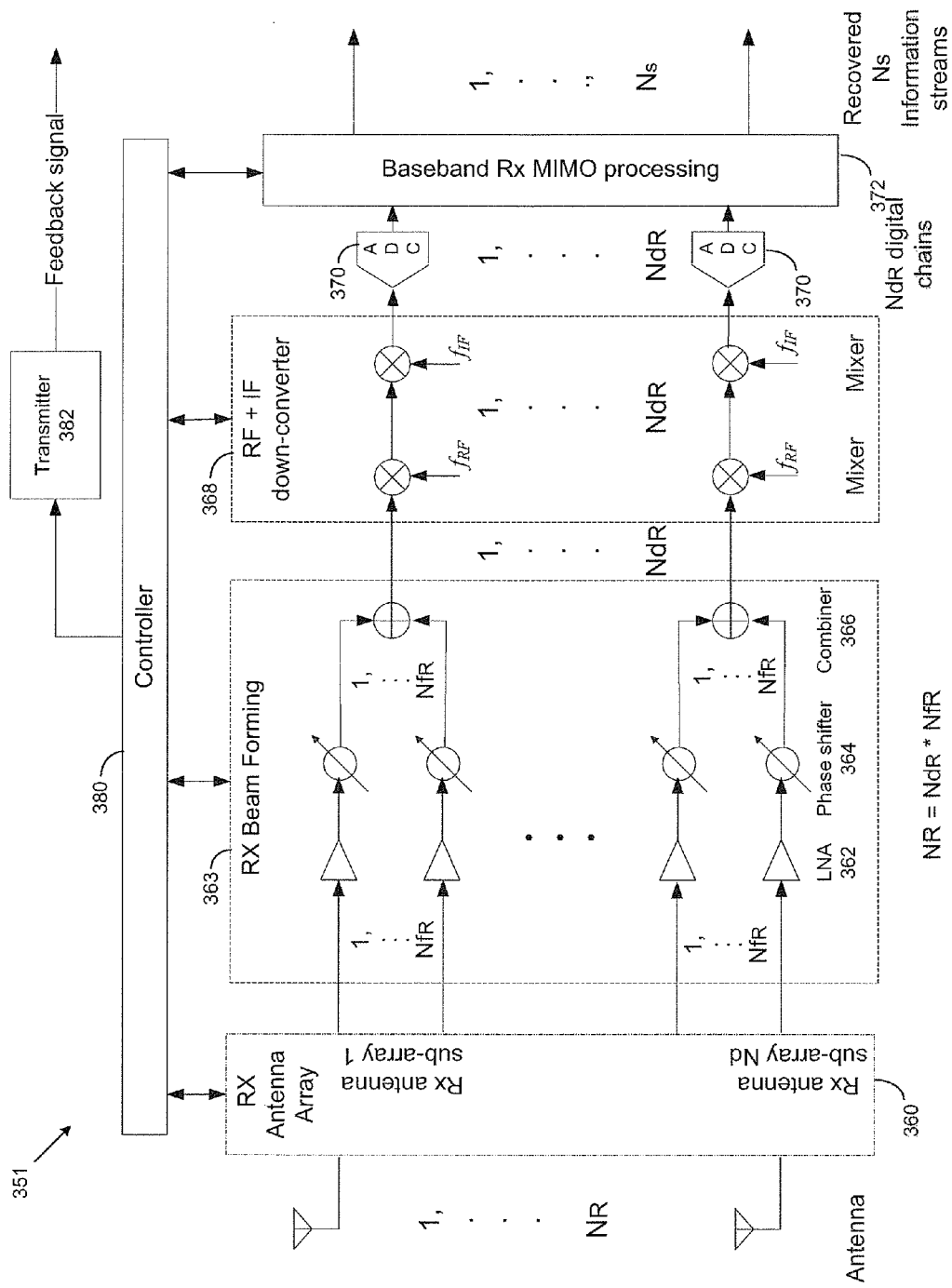
FIG. 3D illustrates another receive path for MIMO baseband processing and analog beamforming with a large number of antennas, according to embodiments of this disclosure.

FIG. 3D illustrates another receive path for MIMO baseband processing and analog beam forming with a large number of antennas, according to embodiments of this disclosure. The receive path 351 includes a beam forming architecture in which the signals received by a sub-array of the antenna array can be processed by amplifiers and phase shifters, to form an analog stream which can be converted and processed in the baseband. The receive path 351 is similar to the receive path 350 of FIG. 3C, except for differences in the beam forming module 363.

As shown in FIG. 3D, the signals received by NfR antennas of a sub-array of the antenna array 360 are processed by the LNAs 362 and phase shifters 364, and are combined at combiners 366 to form an analog stream. There can be NdR sub-arrays (NdR=NR/NFR), with each sub-array forming one analog stream. Hence, in total, NdR analog streams can be formed. Each analog stream can be converted to the baseband signal via a RF and IF down-converter 368 and an ADC 370. The NdR digital signals are processed in the baseband module 372 to recover the Ns information streams. The receive path 351 includes an equal number of antennas for each sub-array. However, the disclosure is not limited thereto. Rather, the number of antennas for each sub-array need not be equal across all sub-arrays.

The receive path 351 includes one output signal from the RF processing with one sub-array of antennas, as one of the inputs to the baseband processing. However, this disclosure is not limited thereto. Rather, one or multiple output signals from the RF processing with one sub-array of antennas, can be the inputs to the baseband processing. When multiple output signals from the RF processing with one sub-array of antennas are the inputs, each of the multiple output signals from the RF processing with one sub-array of antennas, can be connected to part of or all of the antennas of the said sub-array. For example, the RF and IF signal processing with each of the sub-array of antennas can be the same as the processing with the array of antennas as in FIG. 3C, or any type of the RF and IF signal processing with an array of antennas. The process related to one sub-array of the antennas can be referred to as one "RF chain".

In other embodiments, there can be other transmit and receive paths which are similar to the paths in FIGS. 3A through 3D, but with different beam forming structures. For example, the power amplifier 320 can be after the combiner 322, so the number of amplifiers can be reduced.

Figure 4:
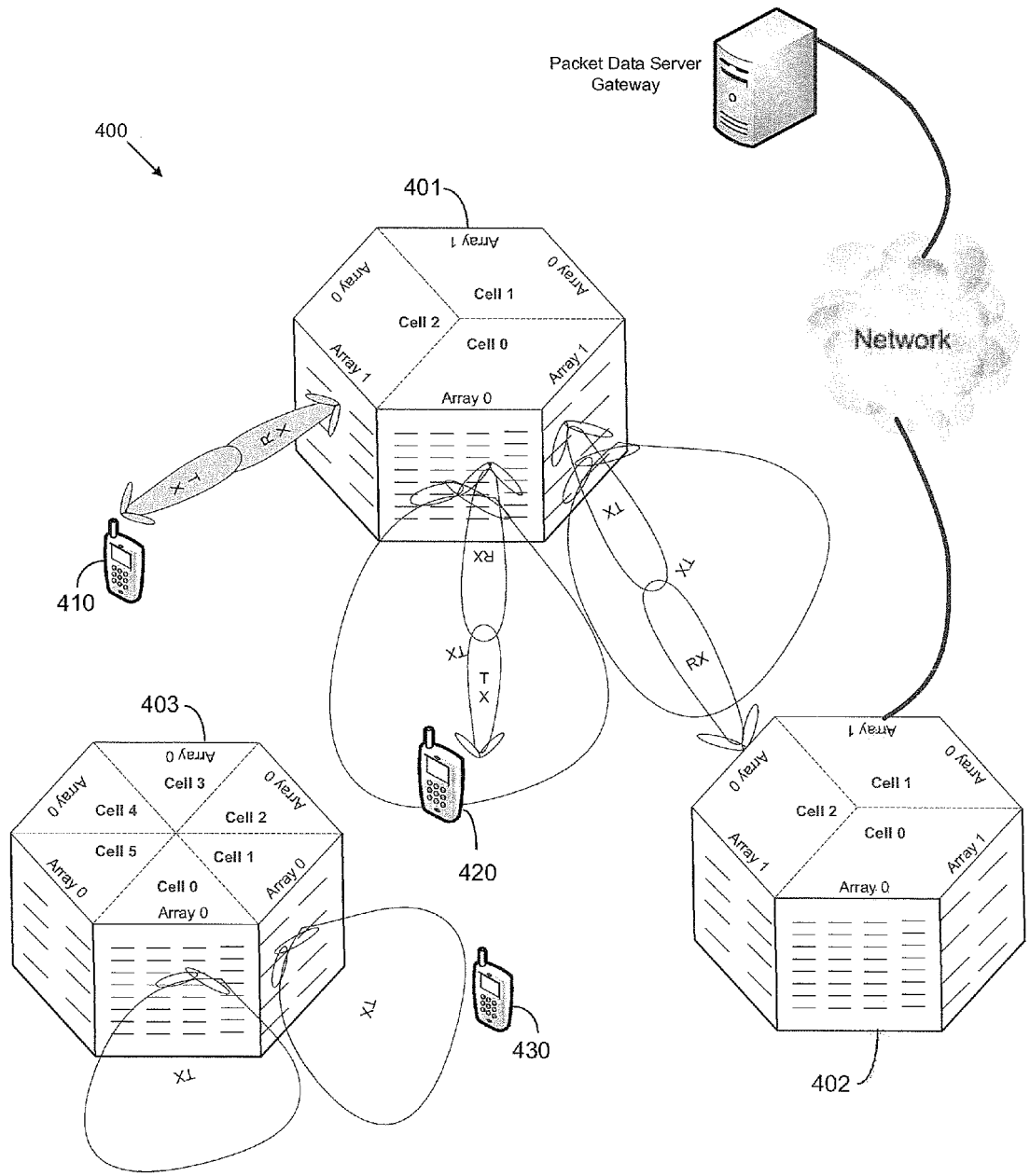
FIG. 4 illustrates a wireless communication system using antenna arrays, according to an embodiment of this disclosure.

FIG. 4 illustrates a wireless communication system using antenna arrays, according to an embodiment of this disclosure. The embodiment of wireless communication system 400 illustrated in FIG. 4 is for illustration only. Other embodiments of the wireless communication system 400 could be used without departing from the scope of this disclosure.

As shown in FIG. 4, system 400 includes base stations 401-403 and mobile stations 410-430. Base stations 401-403 may represent one or more of base stations 101-103 of FIG. 1. Likewise, mobile stations 410-430 may represent one or more of subscriber stations 111-116 of FIG. 1.

BS 401 includes three cells, cell 0, cell 1, and cell 2. Each cell includes multiple arrays (e.g., array 0 and array 1). In cell 0 of BS 401, antenna array 0 and array 1 may transmit the same downlink control channels on a wide beam. However, array 0 can have a different frame structure from array 1. For example, array 0 may receive uplink unicast communication from MS 420, while array 1 can transmit downlink backhaul communication with cell 2 array 0 of BS 402. BS 402 includes a wired backhaul connecting to one or more backhaul networks. A synchronization channel (SCH) and broadcast channel (BCH) can also be transmitted over multiple beams with a beam width not as wide as the widest transmission beam from BS 401 shown in FIG. 4. Each of these multiple beams for the SCH or BCH may have a beam width wider than beams for unicast data communication, which can be for communication between a base station and a single mobile station.

Throughout the disclosure, the transmit beams can be formed by a transmit path such as shown in FIGS. 3A and 3B. Likewise, the receive beams can be formed by a receive path such as shown in FIGS. 3C and 3D.

One or more of the wireless links illustrated in FIG. 4 (e.g., a link between a BS and a MS) may be broken due to a LOS (line of sight) blockage (e.g., objects such as people or cars move into the LOS) or a NLOS (non-line of sight) signal may be too weak (e.g., not have enough strong rays) to maintain the communication. Even if a MS is close to a BS and the MS only moves a short distance, the link may be broken. In such an event, the MS may need to switch links if the current link cannot be recovered. A MS may need to switch links even if the MS is not at the cell edge, because blockages can occur anywhere.

If each antenna in the arrays is not positioned at a high elevation, then many TX or RX beams substantially covering a sphere may be used. For example, with pencil beams (or very narrow beams) many sampling points may be required to cover 360 degrees of azimuth search and 180 degrees of elevation search. Alternatively, for higher antenna heights, at each sampling point of a 360-degree circle of azimuth search, a less than 180-degree elevation search may be sufficient.

Figure 5:
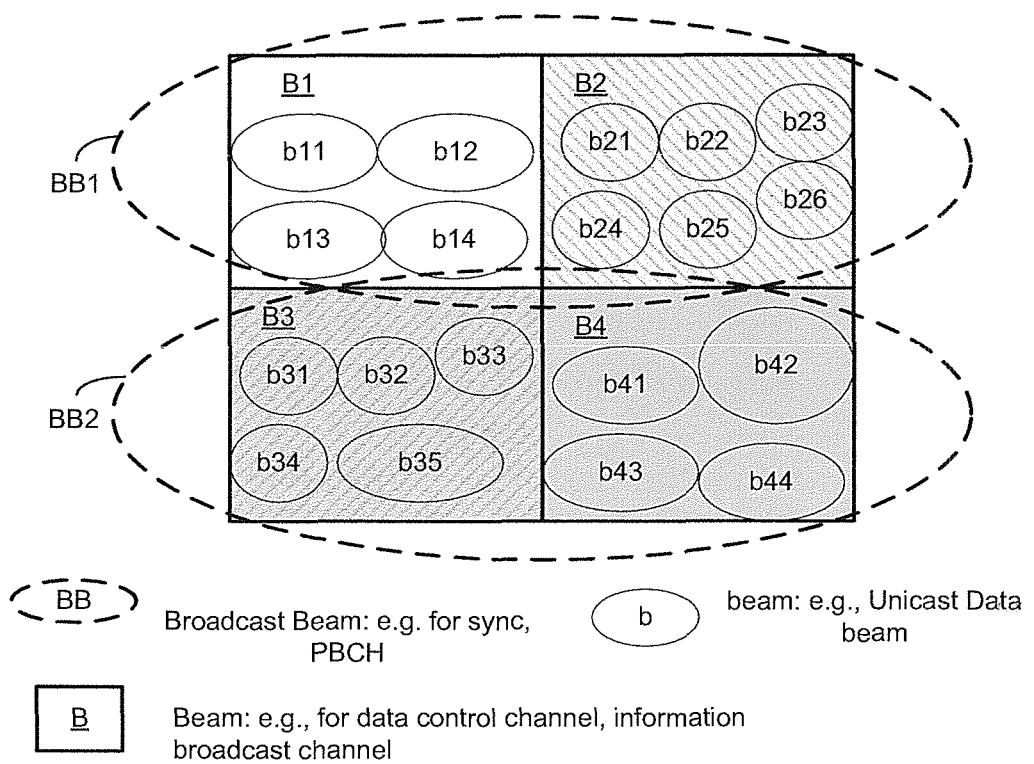
FIG. 5 illustrates an example of different beams having different shapes for different purposes in a sector or a cell, according to one embodiment of this disclosure.

FIG. 5 illustrates an example of different beams having different shapes and different beam widths for different purposes in a sector or a cell, according to an embodiment of this disclosure. The embodiment illustrated in FIG. 5 is for illustration only. Other embodiments could be used without departing from the scope of this disclosure. The sector/cell shown in FIG. 5 may represent one or more of the base station cells depicted in FIG. 4. Throughout the disclosure, the beams (including TX beams and RX beams) can have various beam widths or various shapes, including regular or irregular shapes, not limited by those in the figures.

In a sector or a cell, one or multiple arrays with one or multiple RF chains can generate beams in different shape for different purposes. In FIG. 5, the vertical dimension can represent elevation, and the horizontal dimension can represent azimuth. As shown in FIG. 5, wide beams BB1, BB2 (also called broadcast beams, or "BB") may be configured for synchronization, physical broadcast channel, or a physical configuration indication channel that indicates where the physical data control channel is located, etc. The wide beams BB1, BB2 can carry the same information for the cell.

Although two wide beams BB1, BB2 are illustrated in FIG. 5, a cell may be configured for one or multiple BBs. When there are multiple BBs in a cell, the BBs can be differentiated by implicit or explicit identifier, and the identifier can be used by the MS to monitor and report BBs. The BB beams can be swept and repeated. The repetition of the information on BB beams may depend on the MS's number of RX beams to receive the BB beam. That is, in an embodiment, the number of repetitions of the information on BB beams may be no less than the number of RX beams at the MS to receive the BB beam.

Wide control channel beams B1-B4 (collectively, "B beams") can be used for control channels. Control channel beams B1-B4 may or may not use the same beam width as wide beams BB1, BB2. Beams B1-B4 may or may not use the same reference signals as wide beams BB1, BB2 for the MS to measure and monitor. Wide beams B1-B4 are particularly useful for a broadcast or multicast to a group of MSs, as well as control information for certain MS, such as MS-specific control information, e.g., the resource allocation for a MS.

Although four control channel beams B1-B4 are illustrated in FIG. 5, a cell may be configured for one or multiple B beams. When there are multiple B beams in a cell, the B beams can be differentiated by implicit or explicit identifier, and the identifier can be used by the MS to monitor and report the B beams. The B beams can be swept and repeated. The repetition of the information on B beams can be depending on the MS's number of RX beams to receive the B beam. That is, in an embodiment, the number of repetitions of the information on B beams may be no less than the number of RX beams at the MS to receive the B beams. A MS may or may not search for beams B1-B4 by using the information on beams BB1, BB2.

Beams b11-b44 (collectively, "b beams") may be used for data communication. A b beam may have an adaptive beam width. For some MSs (e.g., a MS with low speed), a narrower beam can be used, and for some MSs, a wider beam can be used. Reference signals can be carried by b beams. Although nineteen b beams are illustrated in FIG. 5, a cell may be configured for one or multiple b beams. When there are multiple b beams in a cell, the b beams can be differentiated by implicit or explicit identifier, and the identifier can be used by the MS to monitor and report the b beams. The b beams can be repeated. The repetition of the information on the b beams may depend on the MS's number of RX beams to receive the b beam. That is, in an embodiment, the number of repetitions of the information on b beams may be no less than the number of RX beams at the MS to receive the b beams. A TX beam b can be locked with a RX beam after the MS monitors the beams. If the data information is sent over a locked RX beam, the repetition of the information on the b beam may not be needed.

Figure 6:
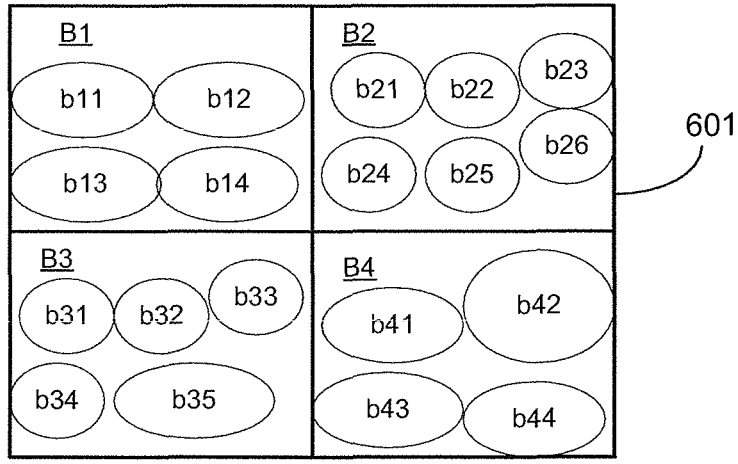
FIG. 6 illustrates the use of beams to carry the same or different information to a mobile station or base station in a cell, according to embodiments of this disclosure.
Figure 6:
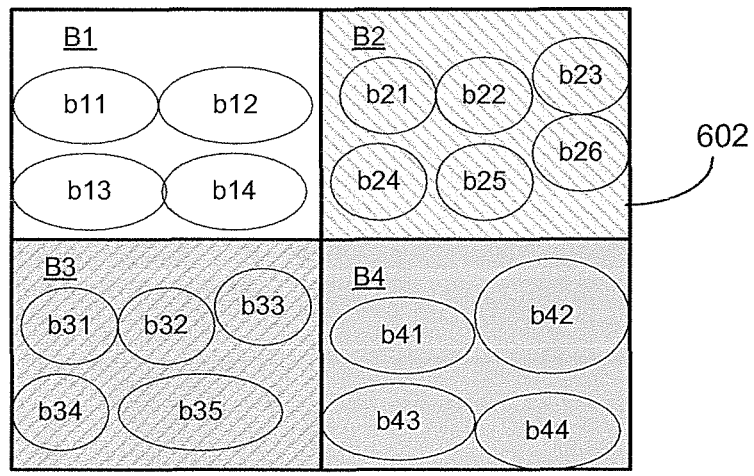
Figure 6:
Figure 6:
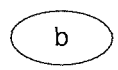

FIG. 6 illustrates the use of beams to carry the same or different information to a mobile station or base station in a cell, according to embodiments of this disclosure. The embodiments illustrated in FIG. 6 are for illustration only. Other embodiments could be used without departing from the scope of this disclosure.

As shown in FIG. 6, beams B1-B4 (collectively, "B beams") may be configured for control channels, such as control information broadcast/multicast to a group of devices such as MSs and BSs, as well as control information for certain devices (e. MS- or BS-specific control information, such as a resource allocation for a MS). The control channel can be, e.g., a physical downlink control channel (PDCCH), which provides common information regarding the resource allocation (e.g., resource blocks, power control, etc.), resource allocation information of the system information blocks (SIBs) to all the MSs in the cell, and MS-specific information about the resource allocation to a certain MS.

All the B beams in a cell may send the same information to all MSs in a cell. The B beams may explicitly or implicitly carry identifiers for the MS to identify them, for monitoring and reporting purposes. In some embodiments, the B beams may not carry any identifier information. In such cases, the MS may not be able to identify them, and the B beams operate like a wide beam which has a coverage of all the B beams in the cell.

In some embodiments, the B beams in a cell may send different information to MSs in a cell. Such B beams may explicitly or implicitly carry identifiers for the MS to identify them, for monitoring and reporting purposes. The B beam may send information related to the MSs in its coverage, e.g., the resource allocation (e.g., resource block, power control, etc.) for the data beams to the MSs in its coverage.

A combination of the above can also be applicable. For example, the control information can be divided into two categories. For example, one category is common information which is common to all MSs in the cell, and the other category is the information associated only with a group of MSs within each B beam's coverage. The common information for the entire group of MSs in the cell can be sent over all B beams, while the information only associated with the MSs in B beam coverage can be sent over the said B beam.

In a sector or a cell, one or multiple arrays with one or multiple RF chains can generate beams in different shapes for different purposes. One RF chain can be for one or multiple antenna subarrays. One antenna subarray can form one or multiple beams.

Digital beamforming can be carried out on the baseband MIMO processing. Analog beam forming can be carried out by adjusting the phase shifter, the power amplifier (PA), or the low noise amplifier (LNA). Wide beams can be formed by analog beamforming, or both analog and digital beamforming. Narrow beams can be formed by both analog and digital beamforming.

Figure 7:
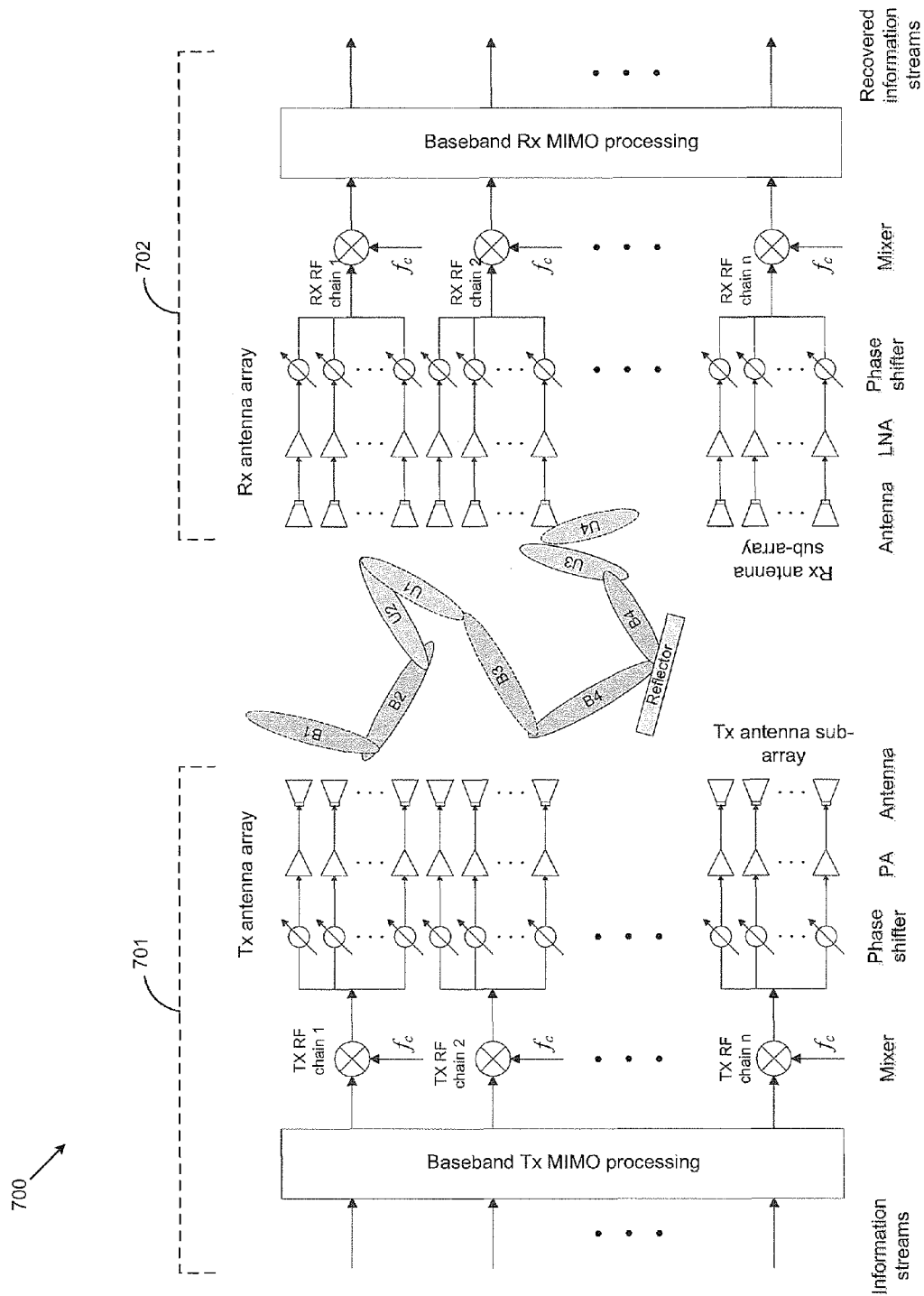
FIG. 7 illustrates an example of signal processing in a transmitter and a receiver in a millimeter wave system, according to an embodiment of this disclosure.

FIG. 7 illustrates an example of signal processing in a transmitter and a receiver in a millimeter wave system, according to an embodiment of this disclosure. The embodiment of millimeter wave system 500 illustrated in FIG. 7 is for illustration only. Other embodiments of millimeter wave system 700 could be used without departing from the scope of this disclosure.

In FIG. 7, millimeter wave system 700 includes a transmitter 701 and a receiver 702. Transmitter 701 may represent one or more of base stations 401-403 or mobile stations 410-430 of FIG. 4. Likewise, receiver 702 may represent one or more of base stations 401-403 or mobile stations 410-430. Transmitter 701 includes a plurality of transmit (TX) RF chains 1-n. Receiver 702 includes a plurality of receive (RX) RF chains 1-n. TX RF chain 1 forms beams B1 and B2. B1 and B2 can be formed by steering. That is, B1 and B2 are not concurrent beams, rather, they are formed one after another in a sequential manner in the time domain. TX RF chain 2 forms beams B3 and B4. B3 and B4 can be formed by steering. RX RF chain 1 forms beams U1 and U2 sequentially, while RX RF chain 2 forms beams U3 and U4 sequentially. As shown in FIG. 7, U2 can receive B2. U3 can receive B4 after B4 is reflected by a reflector. B3 can be received by U1. Thus, there are three possible links (B2, U2), (B3, U1), (B4, U3). Because the beams from each RF chain are formed by steering, the three links (B2, U2), (B3, U1), (B4, U3) are not concurrent. Two possible concurrent connections are (B2, U2) and (B4, U3) as shown in FIG. 7.

The B beams may also include the information of b beams in the other B beams' coverage. For example, considering FIGS. 6 and 7 together, the data control beam B1 can include information about the data beam b21 if the base station determines that the data beam b21 will be used for data communication. The mobile station receives beam B1 and decodes B1, and determines that beam b21 is scheduled to be for the data communication.

One RF chain can be for one or multiple antenna subarrays. One antenna subarray can form one or multiple beams. Digital beamforming can be performed on the baseband MIMO processing. Analog beamforming can be performed by adjusting the phase shifter, the power amplifier (PA), or the low noise amplifier (LNA). The wide beams BB, B can be formed by analog beamforming, or by both analog and digital beamforming. The narrow beams can be formed by both analog and digital beamforming.

The following embodiments are described in the context of communication between a BS and a UE (or MS). It will be understood that these embodiments are also applicable for communication between a BS and another BS, or between a UE and another UE.

In an embodiment, the BS uses common reference signals or cell specific reference signals (CRS) for DL beams or beam patterns. The CRS can be used by the UE to measure the signal strength (e.g., the reference signal received power, the reference signal received quality, signal to interference ratio, signal to interference and noise ratio, signal to noise ratio, and the like) of each different DL beam or beam pattern. The CRS can be carried on the beams for DL control, such as the physical DL control channel (PDCCH). The CRS can also be carried in resources different from the DL control channel.

The CRS can also be used for channel estimation, to decode the information on the beams which have the CRS. For example, the PBCH (physical broadcast channel) and the CRS can be on the same beams or beam patterns (the CRS can be sent at the same time or a different time as the PBCH), and the PBCH can be decoded by estimating the channel via the CRS. For example, the PBCH on the first beam or beam pattern can be decoded by estimating the channel via CRS on the first beam or beam pattern.

The BS sends the DL synchronization ("sync") channel. The sync channel can be steered at one or multiple DL beams. Each DL beam can carry its own beam identifier. The sync channel can carry DL preambles or the cell identifier. The DL beams can be steered for one round, then repeated for another round, until a certain number of rounds are achieved, for the support of UEs with multiple RX beams. As an alternative, the DL beams can repeat the delivered information first at one beam, then steer to a second beam and repeat the information, and then move on to another beam until all the beams for DL sync have transmitted. The UE can monitor and decode the DL sync channel when needed, such as when the UE performs initial network entry or network re-entry, monitoring neighboring cells, coming back to the system after sleeping in idle mode, or coming back from a link failure. Once the UE decodes the DL sync, the UE can know the DL beam identifiers, DL timing for frames and subframes, etc., and the cell identifier of the BS. Up to this point, the UE can know when and where to get the cell specific reference signal (CRS). The DL reference signal can use a sequence such as the cell ID, or the cell ID and the DL beam identifier together. The UE can measure or estimate the channel using the CRS.

A PSBCH (physical secondary broadcast channel) can be used to indicate the PDCCH resource location. The PSBCH can be denoted by other names, such as PCFICH (physical control format indicator channel). The PSBCH can indicate whether the PDCCH for each beam is scheduled or exists in the current subframe, and if it exists, where the resource allocation is located, or the zone for the PDCCH of the beam.

When a UE decodes the PSBCH, the UE can determine whether the PDCCH for each beam exists in the current subframe. Not all of the PDCCH may exist in the same subframe. If the PDCCH (e.g., for the unicast data to certain UEs) is not scheduled in the current subframe, the PSBCH indicates that the PDCCH for that beam does not exist in the current subframe; thus, the UE does not need to proceed to decode the PDCCH, if the UE has a current association to the PDCCH on the beam. Otherwise, if the UE finds that the PDCCH that it currently associates is scheduled in the current subframe, the UE may further decode the PDCCH, to find out whether its data is scheduled.

Note that a UE can be associated with one or more PDCCHs on one or more beams. When a UE is associated with a PDCCH beam, the PDCCH can carry the information for the UE's data resource allocation and so on, or the PDCCH can carry the information for the UE's unicast data, if the UE is scheduled.

The PSBCH can have a common region to point to one or more zones for the PDCCHs. The PSBCH may also have a separate region for each of the PDCCH zones. The PSBCH can have predefined resources, as a predefined physical channel, for example. The UE can know the predefined resources beforehand. If there are multiple regions for the PSBCH, each of the regions can be predefined for the resources and the UE can know the resource allocation beforehand, hence the UE may not need to go to the regions in which the UE does not have association with the PDCCHs. Alternatively, the UE can blind decode to find out the region for each of the beams.

The PSBCH can provide information to the UE about whether the PDCCH on a particular slice is in the subframe, and where to find the PDCCH. For example, a bit map can be used, where the bit map size is the number of PDCCH beams, and each bit can indicate whether the beam is carried in this subframe. For broadcast information, all of the beams can be used; hence the bit map will be all ones. For multicast or unicast, some of the beams may be used; hence the bit map may include some ones and some zeros. Many other designs may achieve a similar result.

When there are multiple RF chains or digital chains, the beams can be associated with FDM (frequency division multiplexing), such that, e.g., one beam can be in one frequency region and another beam can be in another frequency region.

Note that the terms "frame," "subframe," "superframe," or "slot" may be used interchangeably to indicate a short duration of time.

FIGS. 8A through 8D illustrate examples of a downlink frame structure and downlink channels, according to embodiments of this disclosure. The embodiments illustrated in FIGS. 8A through 8D are for illustration only. Other embodiments could be used without departing from the scope of this disclosure.

Figure 8A:
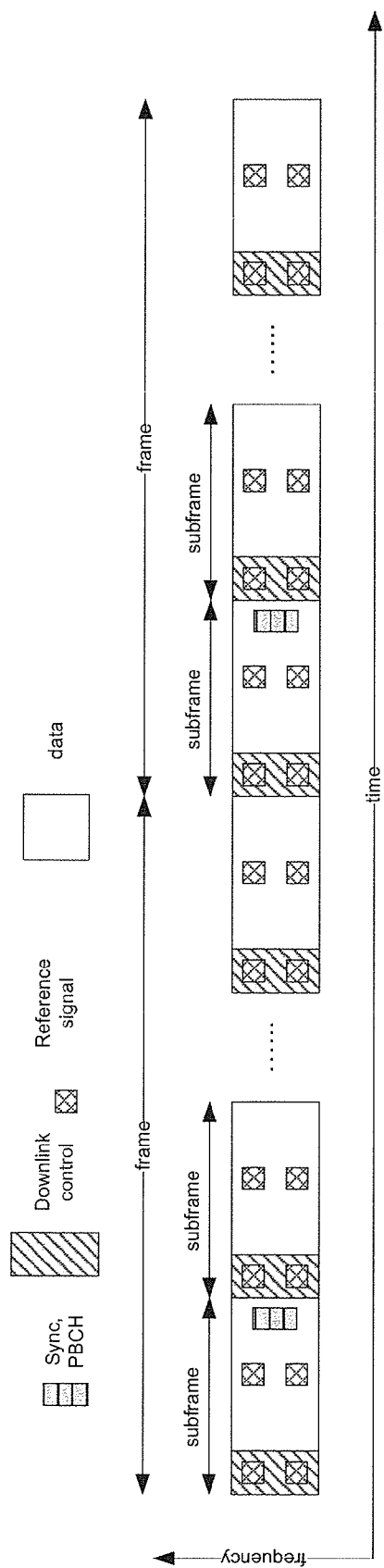

FIG. 8A shows an example frame structure used for downlink. For TDD (time division duplex) systems, the uplink portion may occur in the same interval as the DL subframe or DL frame).

FIG. 8B shows an example of a common PSBCH channel indicating different zones of the PDCCH, while FIG. 8C shows an example of separate PSBCH regions, each indicating a different PDCCH zone. If the PDCCH are not indicated on certain beams, then the PSBCH can indicate so. For example, if the PSBCH indicates that the PDCCH on beam B4 is not scheduled, then the PDCCH on beam B4 may not show in the figure.

FIG. 8D shows an example of sync channel beams. The figure shows that the sync beams are steered for one round, and in each beam, the information (e.g., the beam identifier, the cell ID, etc.) can be repeated multiple times to support the UE with multiple RX beams. Other configurations can be used, e.g., a configuration where the sync beams are steered for multiple rounds, and within one round, the information can be sent once.

Figure 9:
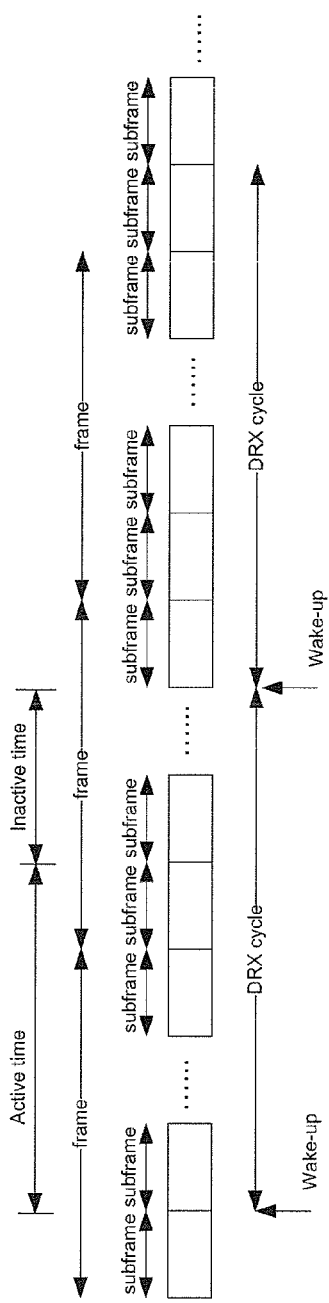
FIG. 9 shows an example of a discontinuous receive (DRX) mode, according to an embodiment of this disclosure.

FIG. 9 shows an example of a discontinuous receive (DRX) mode, according to an embodiment of this disclosure. The embodiment illustrated in FIG. 9 is for illustration only. Other embodiments could be used without departing from the scope of this disclosure.

DRX is a mechanism for facilitating power saving and it can be configured for a given UE. A UE in DRX mode will have periods of activity (where the UE monitors the DL channel or transmits/receives data) and periods of inactivity where the BS will not schedule any transmission. To enter the "active period," the UE may have scheduled periods of wake-up where the BS expects the UE to be in receive mode. The UE may wake up prior to this scheduled period in order to re-synchronize. The configurability is programmable such that the BS can signal the wake up time and the active/inactive duration. The UE can also use certain algorithms to determine or extract the active and inactive times/time periods. If DRX is configured, the UE is allowed to monitor the PDCCH discontinuously.

Figure 10:
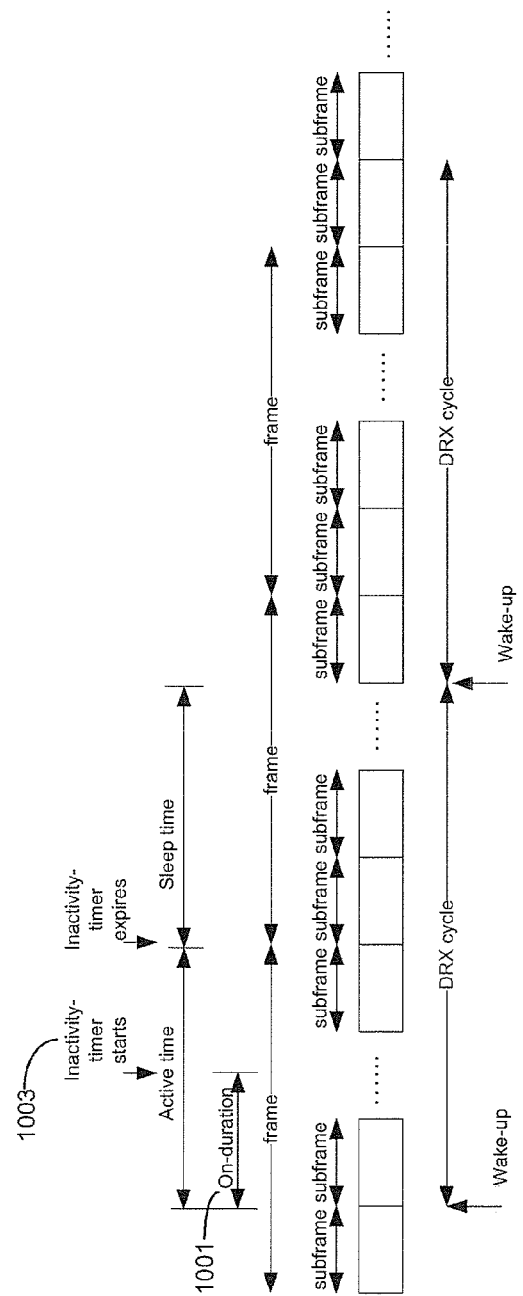
FIG. 10 shows an example of a DRX mode with an on-duration and inactivity timer, according to an embodiment of this disclosure.

FIG. 10 shows an example of a DRX mode with an on-duration and inactivity timer, according to an embodiment of this disclosure. The embodiment illustrated in FIG. 10 is for illustration only. Other embodiments could be used without departing from the scope of this disclosure.

In FIG. 10, the UE applies an on-duration 1001 on wake-up from a DRX sleep. An on-duration is the duration in downlink subframes that the UE waits after waking up from the DRX mode, to receive the PDCCHs. If the UE successfully decodes a PDCCH, the UE stays awake and starts an inactivity timer (as indicated at 1003). The inactivity timer tracks the duration in downlink subframes that the UE waits to successfully decode a PDCCH from the last successful decoding of a PDCCH, failing which the UE re-enters the DRX mode. The UE restarts the inactivity timer following a single successful decoding of a PDCCH for a first transmission only. The active time in DRX mode is the total duration that the UE is awake. This includes the "on-duration" of the DRX cycle, the time UE is performing continuous reception while the inactivity timer has not expired, and the time UE is performing continuous reception while waiting for a DL retransmission. The base station can signal the on-duration and inactivity-timer duration to the UE. The base station can also signal the DRX cycle.

When the UE is in the DRX mode, or when DRX is configured for the UE, the UE can have a scheduled wake up (e.g., at the regular wake up times in the DRX mode). The UE may also have a non-scheduled wake up (e.g., at a time somewhere in the middle of the DRX cycle), due to various reasons, e.g., an occurrence of an emergency message, a HARQ (Hybrid Automatic Repeat reQuest) operation, etc. The embodiments described herein are not limited to be used only for scheduled wake ups in DRX. Rather, the described embodiments are applicable to both scheduled wake up and non-scheduled wake up in DRX.

In LTE cellular systems, the receiver may be omnidirectional. When the UE comes back from DRX mode, the UE can utilize its omnidirectional receiver to receive the signal from the node (e.g. base station) that is transmitting. However, for a system with a large number of antennas, directional beams are often formed for communication; hence, if the UE uses the previously-used receive direction to receive signals from the BS, the UE may not receive the signals. Stated differently, when the UE uses RX beams, the UE may not know which RX beam pattern to use when the UE comes back from the DRX mode, because the RX pattern used right before the DRX mode may not be useful any longer. Thus, embodiments of this disclosure provide support for DRX in communication systems with large number of antennas.

In an embodiment, the UE behavior for waking up from a DRX sleep can be different depending upon the fulfillment of a certain set of conditions as described below. Upon wake up, the UE may simply use the receive beams previously used to receive a signal from the DL TX beam(s). If the UE is able to successfully receive the DL signals, the UE can continue the communication. If the UE is unable to receive or decode signals for a certain time duration (e.g., a certain number of subframes), the UE enters RX beam training, or even RX and TX beam training.

If a first set of conditions is met, then the UE can simply use the receive beams that were previously used to receive DL signals from DL TX beam(s), to continue the communication.

If a second set of conditions is met, the UE performs training for receive beams while the BS continues to use the previous TX beam(s) (i.e., the TX beam(s) previously used prior to the sleeping or inactive state) to communicate. The UE can use certain signals (e.g., synchronization channels, broadcast channels, or reference signals) to train the RX beams for the previously used TX beams. After the beam training, the UE can continue the communication with the BS. The second set of conditions may include that the first set of conditions are not met, or the UE fails to receive or decode using the RX beam(s) previously used, or other suitable conditions. The BS uses the previously used good DL TX beam(s) to communicate to the UE.

If a third set of conditions is met, training for both the RX beams and TX beams is performed. The training can use certain signals, such as the synchronization signal, reference signal, and the broadcast signal. Through training, the UE can determine good DL RX beams and DL TX beams. Then the UE can use procedures similar to random access to restart the data communication, e.g., by feeding back the UE's preferred DL TX beams on the random access channel (RACH), and then the BS can transmit signals over the UE's preferred DL TX beams. The third set of conditions may include the case that both the first set and the second set of conditions are not met, or the UE does not determine any good DL RX beam(s) to receive the previously used good DL TX beam(s), or the UE fails to receive or decode using the RX beam(s) previously used, or the UE fails to receive or decode using the RX beams after the beam training, or other suitable conditions.

In some circumstances, there may be a fourth set of conditions in which TX beam training is performed while RX beam training is not performed, when the UE wakes up from the DRX. For example, these circumstances may include when the UE is not using a RX beam forming function, or when the RX beams (which may correspond to an angle of arrival) change slower than the TX beams (which may correspond to an angle of departure). For the downlink communication, it could be that the TX beams may not change as fast as the RX beams leading to scenarios where RX beam training is needed. Scenarios where RX beam training is not needed may not be as common in such situations.

The aforementioned first set of conditions can include, e.g., the sleeping time (or the inactive duration) of the UE falls within a first range of inactive duration, or the UE has a velocity that falls within a first velocity range. The first range of inactive duration may be related to the first velocity range.

The aforementioned second set of conditions can include, e.g., the sleeping time (or the inactive duration) of the UE falls within a second range of inactive duration, or the UE has a velocity that falls within a second velocity range. The second range of inactive duration may be related to the second velocity range. For the same velocity range, the inactive duration in the first range of inactive duration may be shorter than the inactive duration in the second range of inactive duration.

The aforementioned third set of conditions can include, e.g., that the sleeping time (or the inactive duration) of the UE falls within a third range of inactive duration, or the UE has a velocity that falls within a third velocity range. The third range of inactive duration may be related to the third velocity range. For the same velocity range, the inactive duration in the first and second ranges of inactive duration may be shorter than the inactive duration in the third range of inactive duration.

Figure 11:
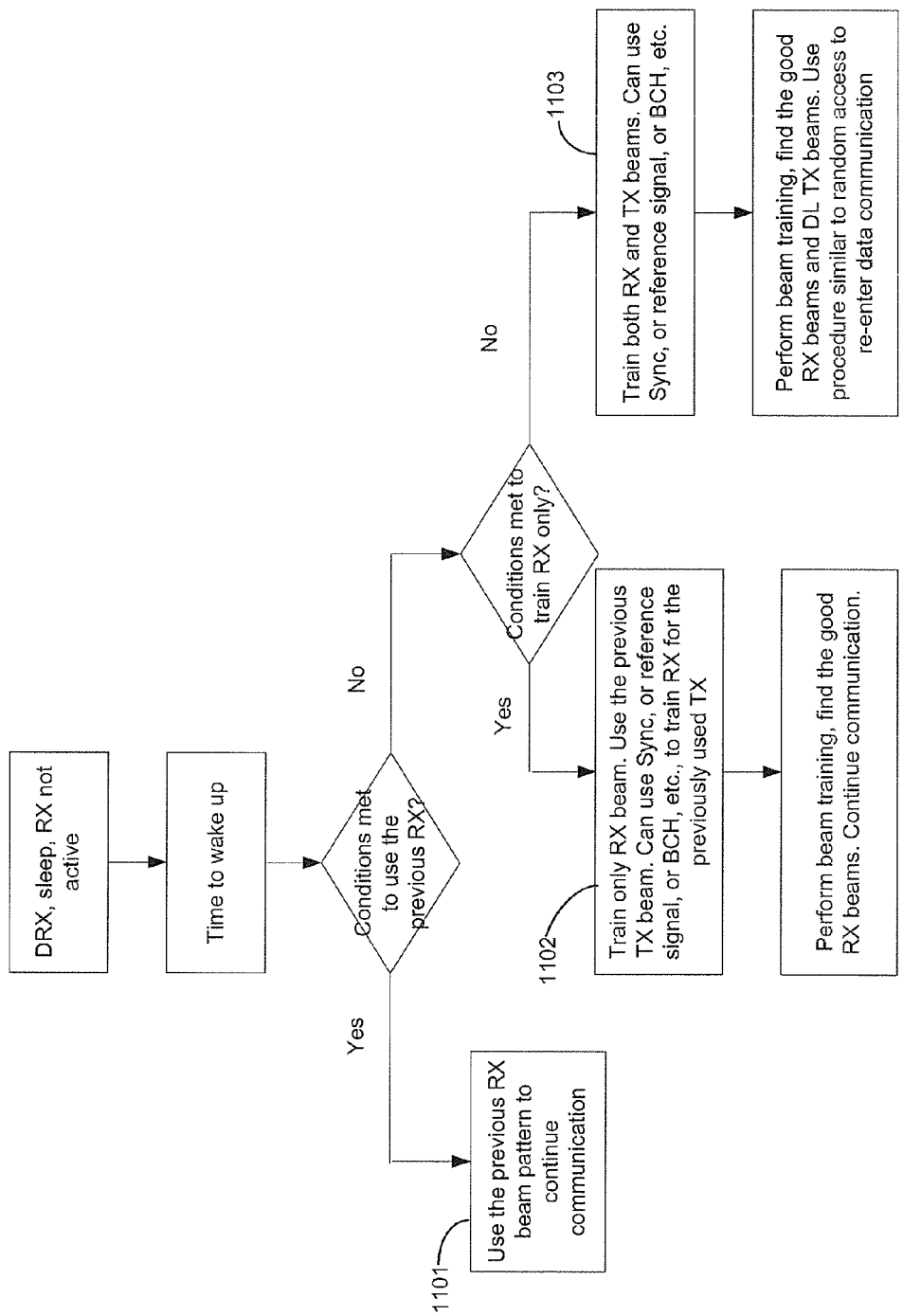
FIG. 11 illustrates different operations that may be performed upon waking up from a DRX sleep mode, according to an embodiment of this disclosure.

FIG. 11 illustrates the different operations that may be performed upon waking up from the DRX sleep mode, according to an embodiment of this disclosure. The embodiment illustrated in FIG. 11 is for illustration only. Other embodiments could be used without departing from the scope of this disclosure. As shown in FIG. 11, different operations are performed depending on whether (a) no beam training is needed (indicated at 1101), (b) only RX beam training is needed (indicated at 1102), or (c) both TX and RX beam training are needed (indicated at 1103).

Figure 12:
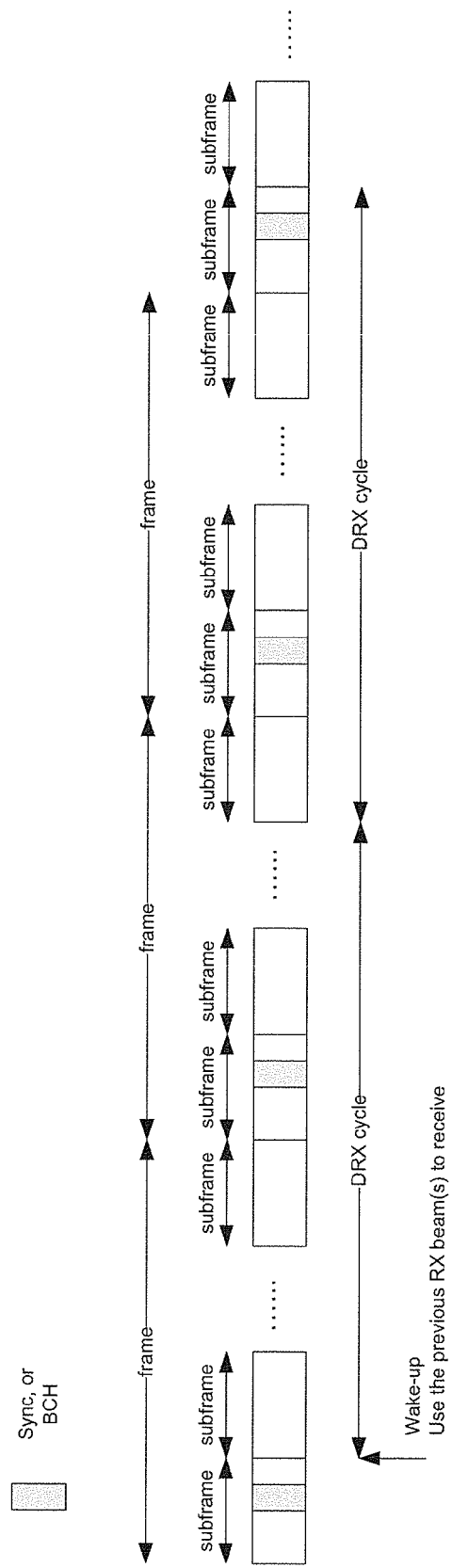
FIG. 12 shows an example of waking up and using previously-used receive (RX) beam(s) to receive, according to an embodiment of this disclosure.

FIG. 12 shows an example of waking up and using the previously-used RX beam or beams to receive, according to an embodiment of this disclosure. The embodiment illustrated in FIG. 12 is for illustration only. Other embodiments could be used without departing from the scope of this disclosure.

If the previously used DL TX beam(s) are still good, but the previously used RX beam(s) are not good one(s) when the UE wakes up in the DRX mode (e.g., assuming certain conditions are met), the UE can perform RX beam training to determine the good DL RX beam(s) associated with the good DL TX beams or the previously used DL TX beam(s).

The UE can use the sync channel or a reference signal (e.g., the cell specific reference signal (CRS)) to perform the RX beam training. Since the DL TX beam(s) may still be good, the UE can monitor the appropriate resource (e.g., the right timing, frequency, space resources allocated for the good DL TX beam(s)) to perform the RX beam training, to see which RX beam(s) would be good one(s) for the good DL TX beam(s). For example, if the UE previously determines that DL TX beams 1 and 3 are good DL TX beams, the UE can monitor the right resources for DL TX beams 1 and 3 (e.g., the resources for the reference signals on DL TX beams 1 and 3) to perform the RX beam training.

The UE can use trained RX beams to receive the corresponding DL TX beams (e.g., the good RX beams for the previously used DL TX beam(s)), such as the beams carrying the PDCCH, and to receive data in the following subframe or subframes.

After waking up from DRX mode, the UE may not have performed feedback of the channel measurement (such as the channel quality indicator (CQI) which may use the CSI-RS measurement). In such a case, the BS can schedule the data on the wide beam which can be the same as or similar to the beams used for the PDCCH, sync channel, or BCH channel.

If the UE needs to feed back CQI, the UE can get the PDCCH, and get the uplink grant to feed back the CQI to the BS. After the BS receives the CQI, the BS can schedule the UE on narrower beams for data communication. Then the UE will get the PDCCH, and get the DL data on narrower beam(s).

Figure 13:
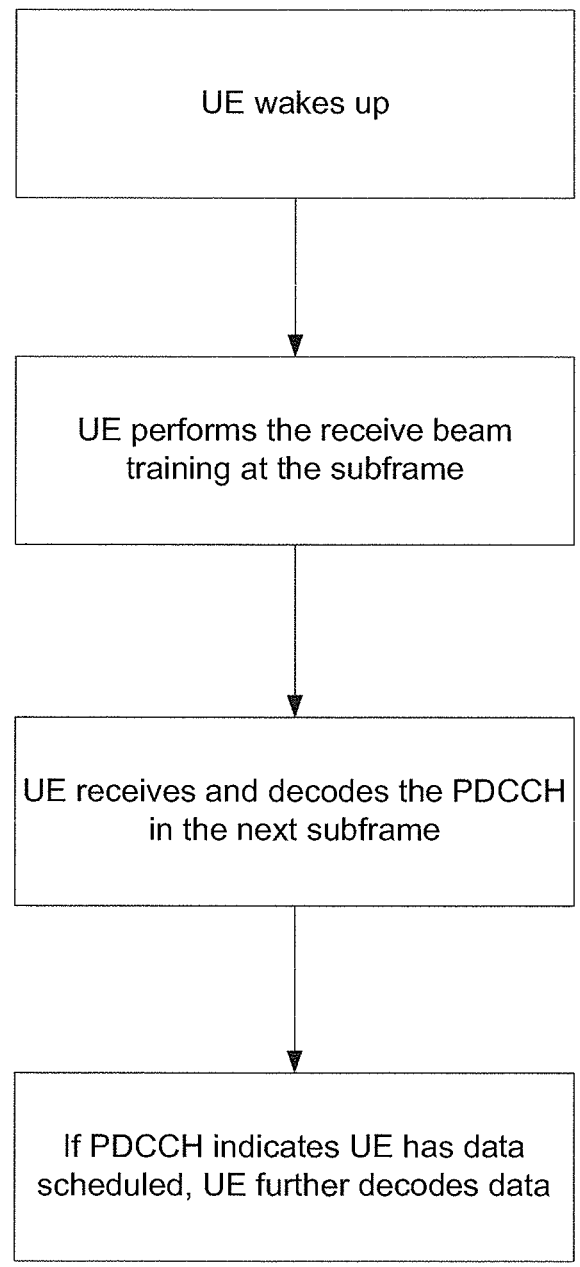
FIG. 13 shows an example of a UE communicating using trained RX beams, according to an embodiment of this disclosure.

FIG. 13 shows an example of a UE communicating using trained RX beams, according to an embodiment of this disclosure. The embodiment illustrated in FIG. 13 is for illustration only. Other embodiments could be used without departing from the scope of this disclosure. As shown in FIG. 13, the UE wakes up in the DRX mode, performs RX beam training, and resumes communication using the trained RX beams in the following subframe.

Figure 14A:
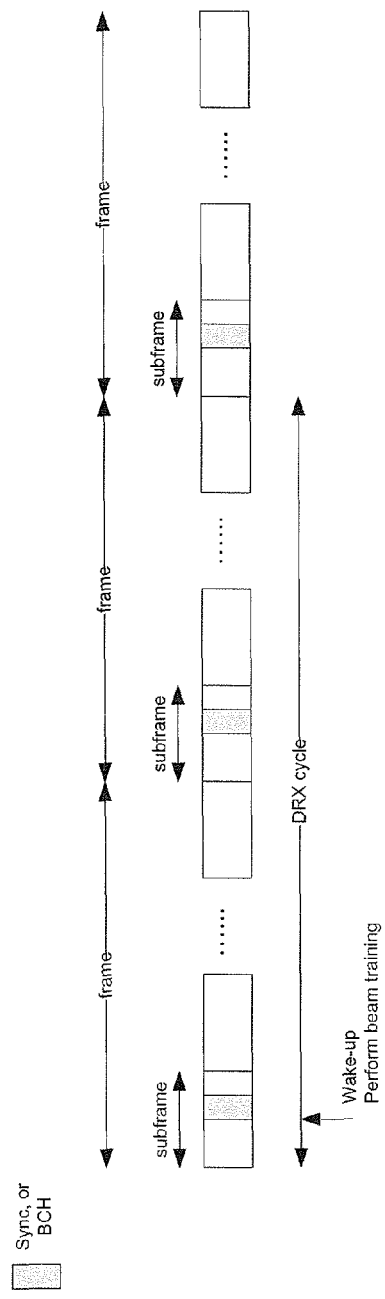
FIGS. 14A through 14C illustrate examples of a UE waking up and performing training on RX beam(s), according to embodiments of this disclosure.
Figure 14B:
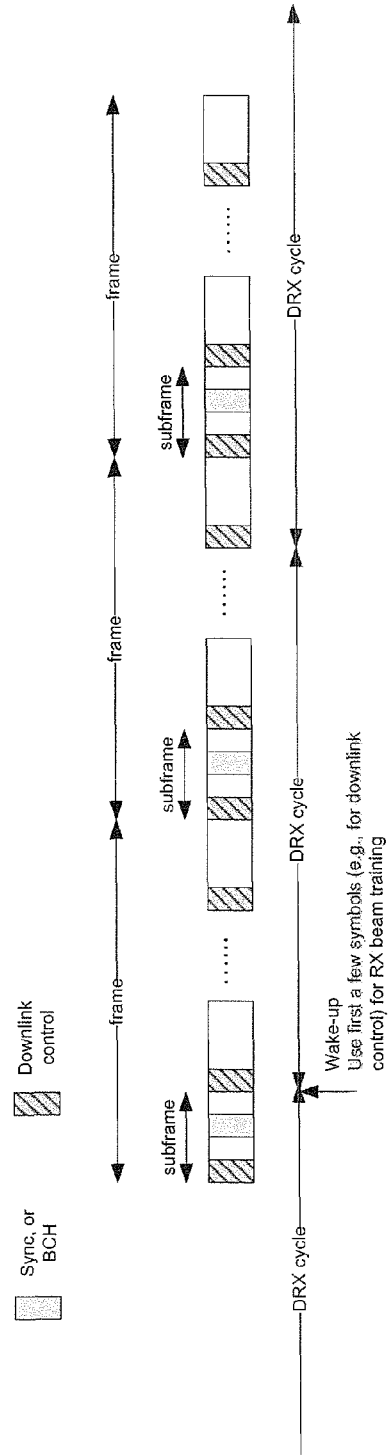
Figure 14C:
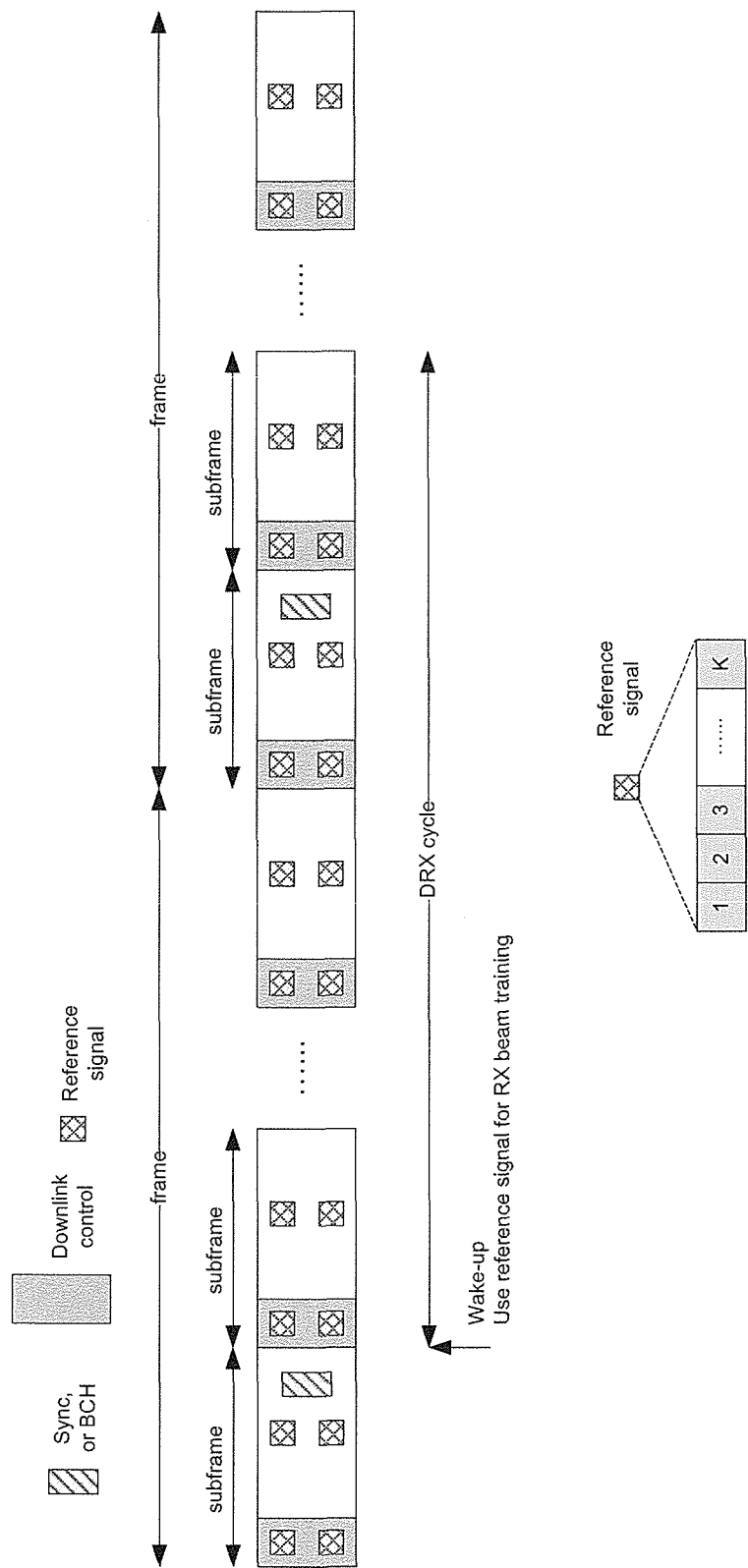

FIGS. 14A through 14C illustrate examples of a UE waking up and performing training on RX beam(s), according to embodiments of this disclosure. The embodiments illustrated in FIGS. 14A through 14C are for illustration only. Other embodiments could be used without departing from the scope of this disclosure.

In FIG. 14A, the UE performs RX beam training from the SCH or BCH beams. The UE may wake up when the SCH or BCH beams are transmitted, which may not be at the beginning of the DRX cycle. Similarly, in FIG. 14B, the UE performs RX beam training from beams on a first few symbols (e.g., those used for downlink control). The UE may wake up when the reference signals are transmitted, which may not be at the beginning of the DRX cycle.

In FIG. 14C, the UE performs RX beam training from the beams associated with the reference signal. The reference signal may have K beams. Each beam may transmit the reference signal sequence multiple times so that the UE can steer the RX beams to perform training. It is also possible that reference signals can be steered for multiple rounds and in each round of steering there can be K beams. The multiple rounds of steering are used for the UE with one or multiple RX beams to perform the beam training.

In some embodiments, the UE's training on the RX beam(s) can be performed after the wake up time (including both scheduled and non-scheduled wake up times). For example, the UE's training may be performed in the on-duration, where the on-duration is as shown in FIG. 10. As an alternative, the UE's training on the RX beam(s) can be performed prior to the scheduled wake up time. When the scheduled wake up time arrives, the UE should already have trained the RX beam(s), which prepares the UE to receive the downlink signals from the BS.

Figure 15:
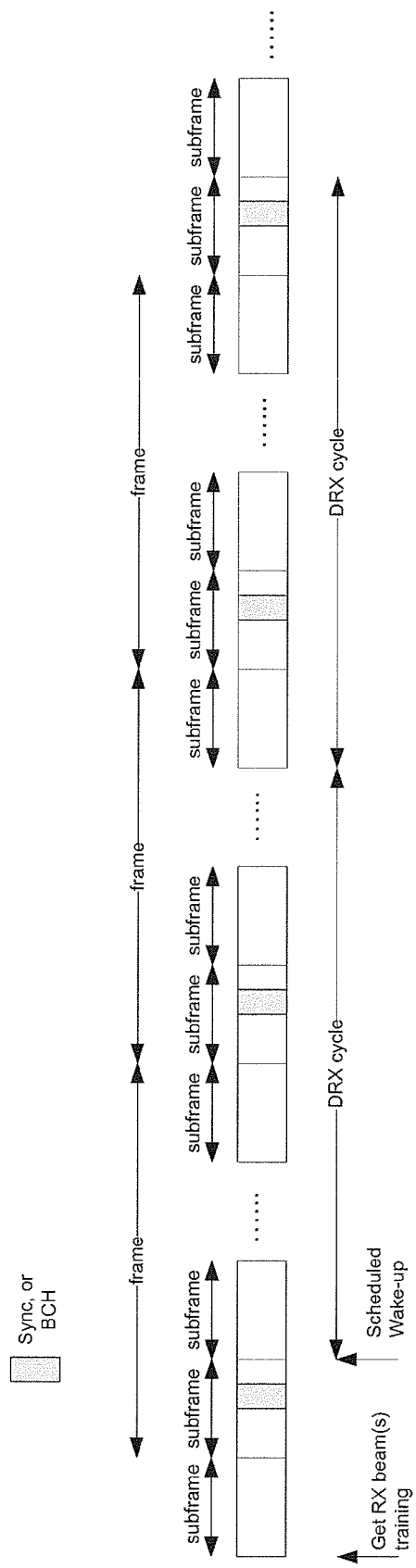
FIG. 15 shows an example of a UE training on the RX beam(s), prior to the scheduled wake up time, according to an embodiment of this disclosure.

FIG. 15 shows an example of a UE training on the RX beam (s), prior to the scheduled wake up time, according to an embodiment of this disclosure. The embodiment illustrated in FIG. 15 is for illustration only. Other embodiments could be used without departing from the scope of this disclosure.

If the previously used DL TX beam(s) are still good, but the previously used RX beam(s) are not good one(s) when the UE wakes up from the DRX mode (e.g., assuming certain conditions are met), the UE can perform RX beam training to determine the good DL RX beam(s) associated with the good DL TX beams or the previously used DL TX beam(s).

The UE can use the sync channel or a reference signal (e.g., the cell specific reference signal (CRS)) to perform the RX beam training. Since the DL TX beam(s) may still be good, the UE can monitor the appropriate resource (e.g., the right timing, frequency, space resources allocated for the good DL TX beam(s)) to perform the RX beam training, to see which RX beam(s) would be good one(s) for the good DL TX beam(s).

The UE can perform RX beam training at the beginning of a subframe (e.g., have reference signals for training purposes on certain symbols at the beginning of a subframe). The UE can use trained RX beam(s) to receive the corresponding DL TX beams (e.g., the good RX beams for the previously used DL TX beam(s)), such as the beams carrying the PDCCH, and to receive data if scheduled in the same subframe. The PDCCH beams for the UE that needs RX beam training and data if scheduled can be after the RX beam training.

After waking up from DRX mode, the UE may not have performed feedback of the channel measurement (such as the channel quality indicator (CQI) which may use the CSI-RS measurement). In such a case, the BS can schedule the data on the wide beam which can be the same as or similar to the beams used for the PDCCH, sync channel, or BCH channel.

If the UE needs to feed back CQI, the UE can get the PDCCH, and get the uplink grant to feed back the CQI to the BS. After the BS receives the CQI, the BS can schedule the UE on narrower beams for data communication. Then the UE will get the PDCCH, and get the DL data on narrower beam(s).

Figure 16:
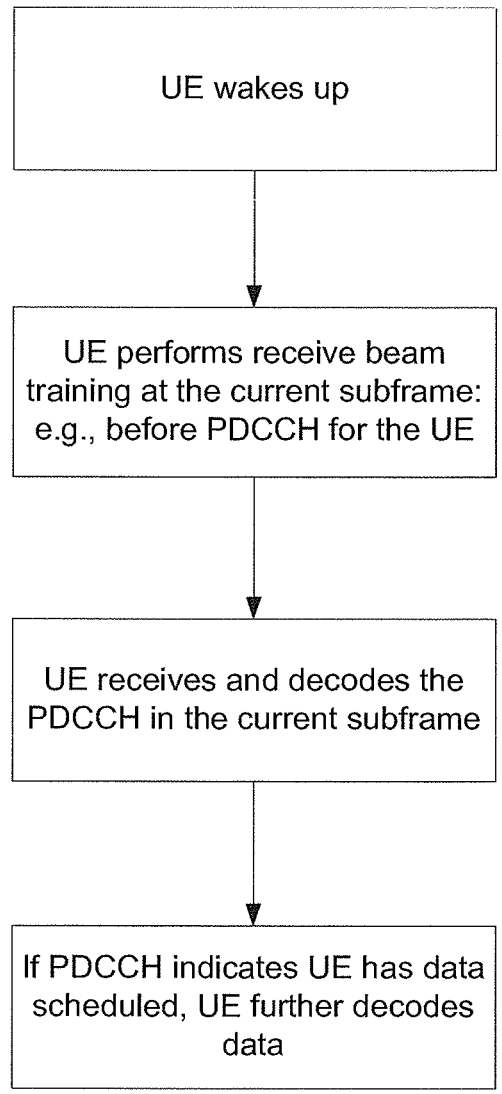
FIG. 16 shows an example of a UE communicating using trained beams, according to another embodiment of this disclosure.

FIG. 16 shows an example of a UE communicating using trained beams, according to another embodiment of this disclosure. The embodiment illustrated in FIG. 16 is for illustration only. Other embodiments could be used without departing from the scope of this disclosure. As shown in FIG. 16, the UE wakes up in the DRX mode, performs RX beam training and resumes communication using the trained RX beams in the same subframe.

If the previously used DL TX beam(s) and RX beam(s) are no longer good beams when the UE wakes up in the DRX mode (e.g., assuming certain conditions are met), the UE can perform DL TX and RX beam training to determine the good DL RX beam(s) associated with the good DL TX beams, or to determine the good pairs of DL TX and RX beams.

The beam training can use beams carrying the sync channel, the BCH channel, a reference signal, and the like. After beam training, the UE may need to send feedback information about the DL TX beams. The feedback of the DL TX beams can be based on a procedure similar to the random access procedure. The random access procedure may be executed in a contention free fashion since the UE is still in the system.

In some embodiments, the UE's training on the DL TX and RX beam(s) can be performed after the wake up time. For example, the UE's training may be performed in the on-duration, where the on-duration is as shown in FIG. 10. As an alternative, the UE's training on the TX and RX beam(s) can be performed prior to the scheduled wake up time. When the scheduled wake up time arrives, the UE should already have trained the RX beam(s), which prepares the UE to receive the downlink signals from the BS.

Figure 17:
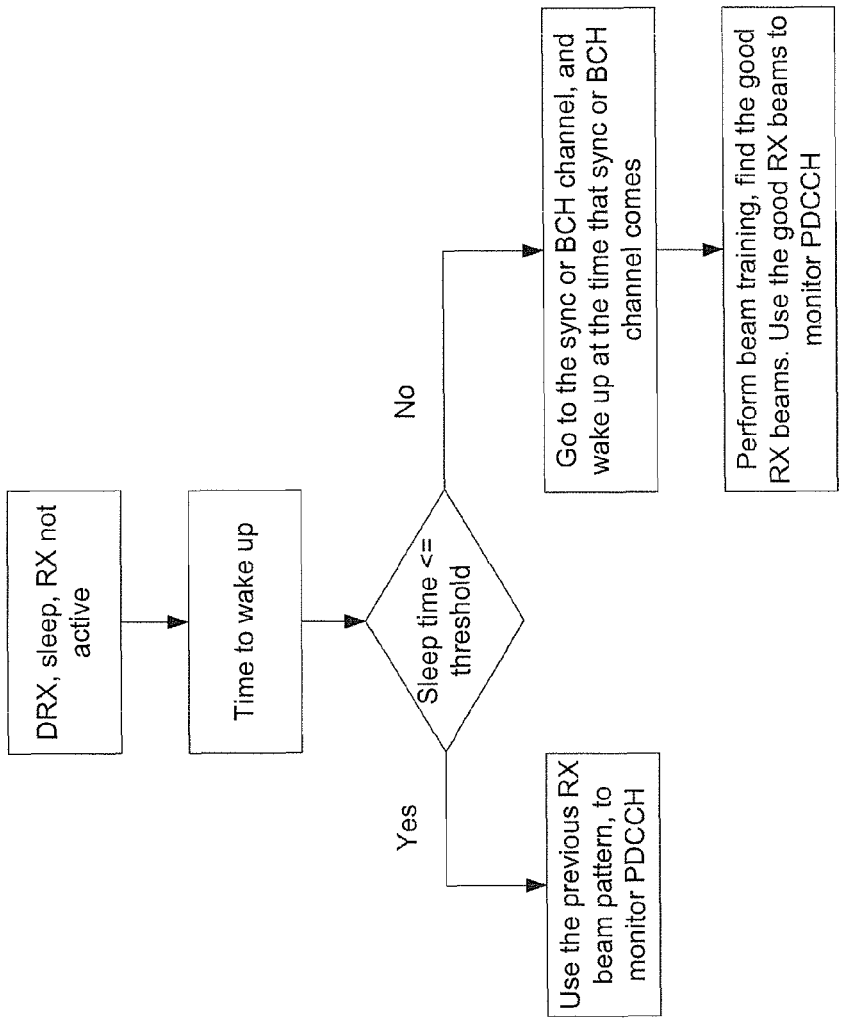
FIG. 17 shows an example of a UE that wakes up in DRX mode, performs RX beam training, and resumes communication, according to an embodiment of this disclosure.

FIG. 17 shows an example of a UE that wakes up in DRX mode, performs RX beam training, and resumes communication, according to an embodiment of this disclosure. The embodiment illustrated in FIG. 17 is for illustration only. Other embodiments could be used without departing from the scope of this disclosure.

As shown in FIG. 17, a UE is initially in DRX mode. The UE wakes up from the DRX mode and applies an on-duration. On-duration is the duration in downlink subframes that the UE waits, after waking up from DRX mode, to receive PDCCHs. The UE tries to receive PDCCHs. If the UE successfully decodes a PDCCH, the UE stays awake and starts the inactivity timer.

If the UE's sleeping time is long, the previously used RX beam(s) for the PDCCH may no longer be good RX beam(s) to receive the upcoming PDCCH. Hence, the RX beam(s) may need to be re-trained. The training of the beams can use DL beams carrying a sync channel, a BCH channel, reference signals, and the like. Alternatively, if the UE's sleeping time is short, the previously used RX beam(s) for the PDCCH may still be acceptable to use. The UE can use the previous RX beam(s).

In an embodiment, in DRX mode, the UE wakes up to receive the SCH and/or BCH channel(s) if certain conditions are met. The conditions may include, but are not limited to, the case that the sleep time is longer than a threshold where the threshold may be different for different velocities of the UE.

In an embodiment, the FDM (frequency division multiplexing) control region can give the UE longer time to perform the training. To support the FDM control region, multiple RF chains may be used, so that the control beams and data beams can be concurrently (in the time domain) transmitted.

Figure 18A:
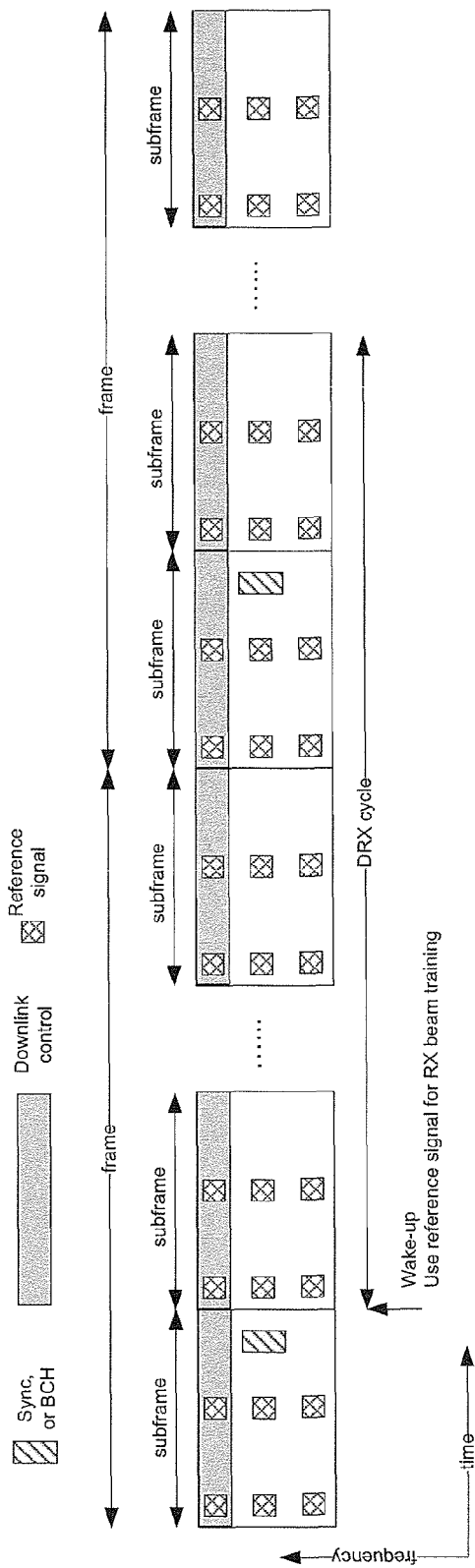
FIGS. 18A and 18B illustrate examples of signals for beam training purposes, according to embodiments of this disclosure.
Figure 18B:
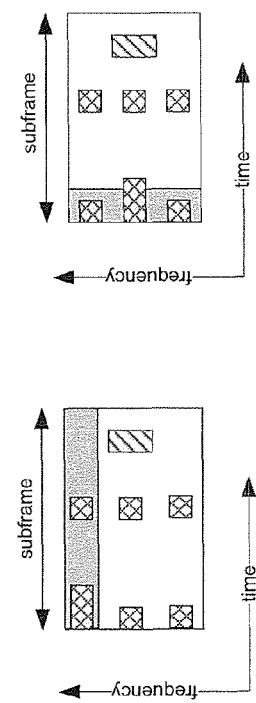

FIGS. 18A and 18B illustrate examples of signals for beam training purposes, according to embodiments of this disclosure. The embodiments illustrated in FIGS. 18A and 18B are for illustration only. Other embodiments could be used without departing from the scope of this disclosure.

FIG. 18A shows an example of using a FDM control region for beam training purposes to support DRX. To enable the UE to wake up and perform beam training in the subframe, each subframe can include some signals for training purposes. Such signals can be in the first slot or the first few slots in each subframe. Such signals can include, a reference signal. The reference signal can serve for the purpose of training.

Reference signals in the control region can be used for RX beam training. The TX for the UE can be the same (no change, long term change), but the RX can be changed. Hence, the reference signal can be repeated to allow RX beam training. FIG. 18B shows an example of using longer reference signals for training purpose.

Figure 19:
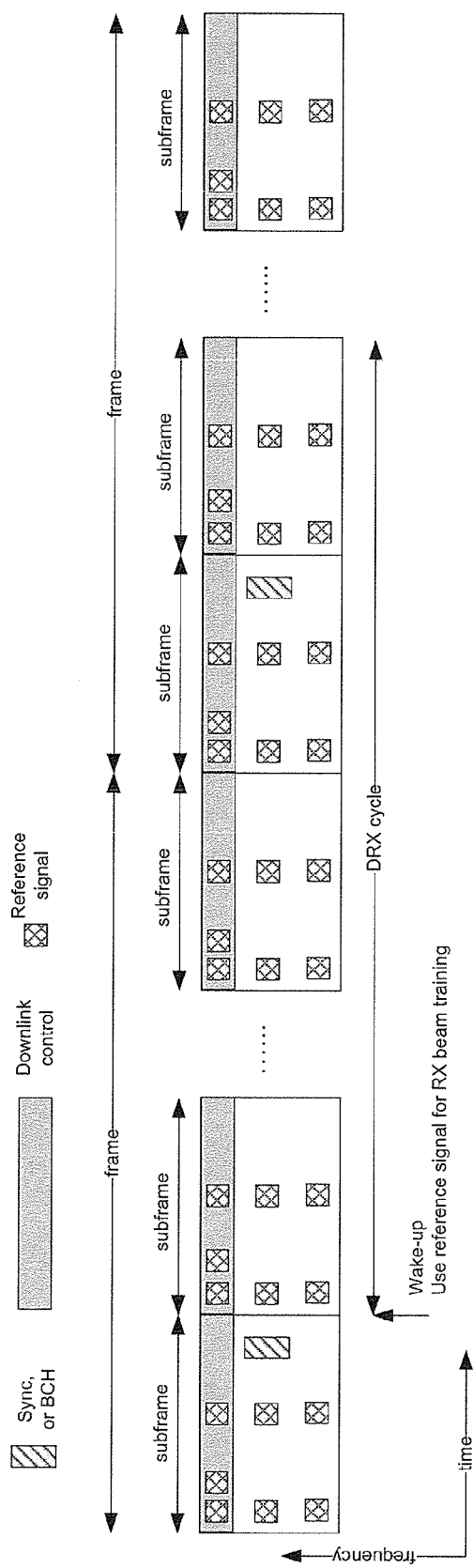
FIG. 19 shows an example of reference signals for training in the downlink control channel at the beginning of the subframe, according to an embodiment of this disclosure.

FIG. 19 shows an example of reference signals for training in the downlink control channel at the beginning of the subframe, according to an embodiment of this disclosure. The embodiment illustrated in FIG. 19 is for illustration only. Other embodiments could be used without departing from the scope of this disclosure. As shown in FIG. 19, there can be more reference signals in the downlink control channel at the beginning of the subframe, to train the RX beam of the UE.

In some embodiments, the DRX can be configured on a per RF chain basis, as opposed to limiting DRX to a per UE basis. If a certain RF chain's transmission or receiving is not effective (e.g., because there are objects or obstacles blocking the signal from or to the RF chain), the DRX can be applied and configured for the UE's RF chain. Different DRX configurations can be provided for different RF chains of the UE. There can be one or more of the DRX patterns per UE. The BS can configure different DRX configurations to the UE based on different RF chains of the UE.

In an embodiment, the beam training can be performed at the beginning of the subframe. The reference signal used by the UE for RX beam training upon wake up may be of longer duration than the regular reference signal that is not used for the UE RX beam training. In addition to the regular DL control channel used by the connected mode UEs, an additional DL channel may be introduced specifically for UEs coming out of sleep mode that are in need of RX training. The UE can first get the RX beam training. Then it uses the trained RX beam(s) or good RX beam(s) to receive the PDCCH channel at a later time in the same subframe.

Figure 20A:
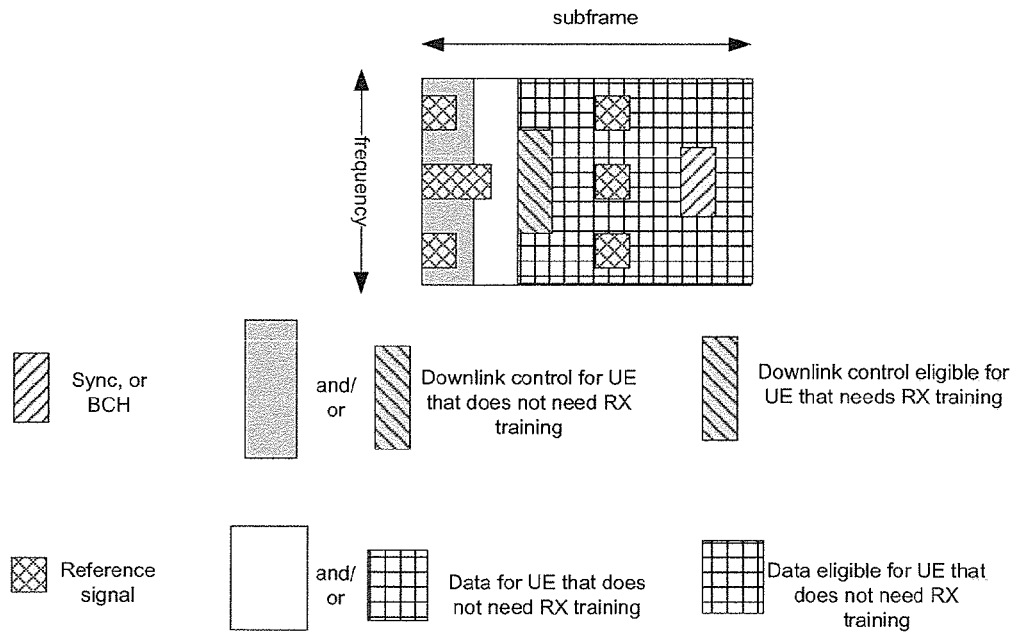
FIGS. 20A and 20B show examples of beam training and data communication in the same subframe, according to embodiments of this disclosure.
Figure 20B:
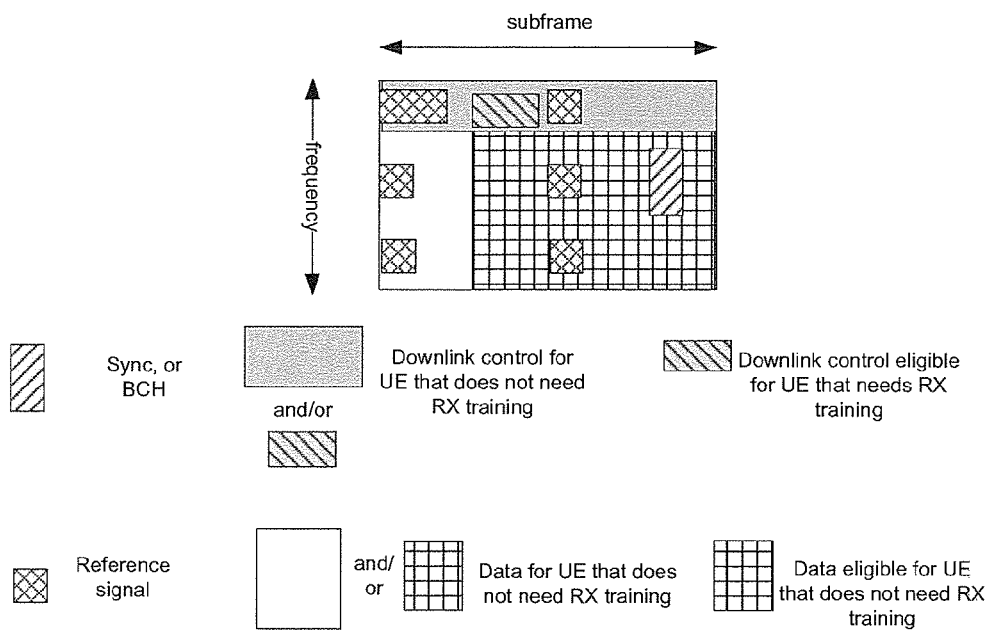

FIGS. 20A and 20B show examples of beam training and data communication in the same subframe, according to embodiments of this disclosure. The embodiments illustrated in FIGS. 20A and 20B are for illustration only. Other embodiments could be used without departing from the scope of this disclosure. In the figures, the UE that needs RX beam training also may engage in data communication in the same subframe that the UE performs the beam training. FIG. 20A shows an example in TDM mode. FIG. 20B shows an example in FDM mode.

The embodiments of this disclosure can be applied for data communication when the UE is in connected mode (including DRX-configured mode), or in regular mode (no DRX-configured mode).

Figure 21:
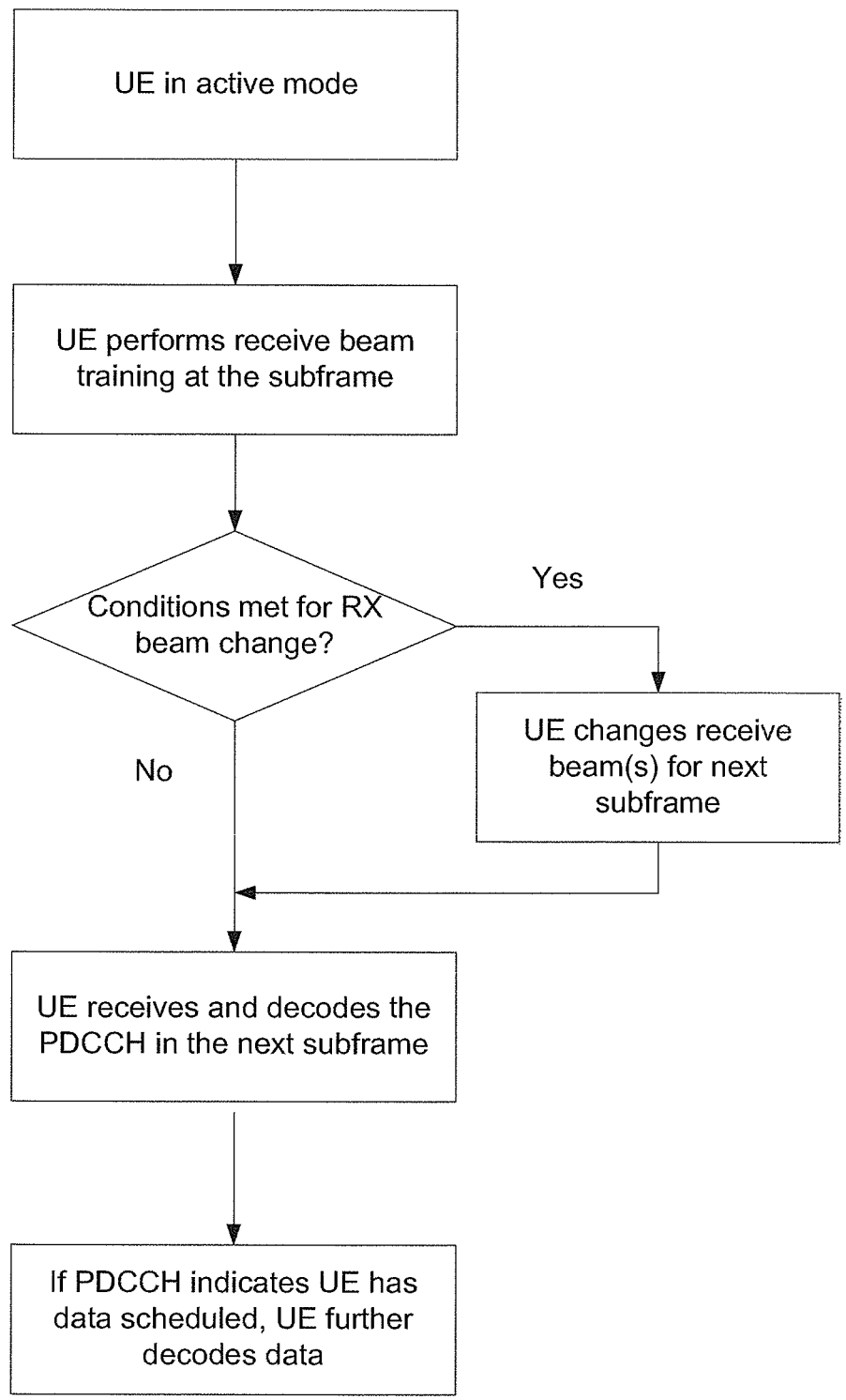
FIG. 21 shows an example of data communication when the UE is in connected mode or regular mode, according to an embodiment of this disclosure.

FIG. 21 shows an example of data communication when the UE is in connected mode or regular mode, according to an embodiment of this disclosure. The embodiment illustrated in FIG. 21 is for illustration only. Other embodiments could be used without departing from the scope of this disclosure.

Various embodiments of this disclosure may include any one or more of the following features described below.

The UE can possess DL sync and up-to-date system information before the UE transmits anything on the channel after waking up from sleep mode.

The UE can use the receive beams previously used to receive signals from DL TX beam(s), when the UE wakes up from the DRX mode. If the UE can receive on the DL beams, the UE can continue the communication. If the UE could not receive or decode signals from the BS (e.g., after trying for a certain time duration (e.g., a certain number of subframes)), the UE can train the RX beams or train both the RX and TX beams.

Upon waking up from sleep mode, if a first set of conditions is met for the UE to use the receive beams previously used to receive signals from DL TX beam(s), the UE can use the receive beams to continue the communication. For example, the UE can use the receive beam(s) previously used to receive certain signals from certain TX beams.

Upon waking up from sleep mode, if a second set of conditions is met for the UE to perform receive beam training only, the UE can perform training for receive beams. The base station can use the previously used TX beam(s) (i.e., the TX beam(s) previously used prior to the sleeping or inactive state) to communicate with the UE. The UE can use certain signals (e.g., synchronization channels, broadcast channels, or reference signals) to train the RX beams for the previously used TX beams. After the beam training, the UE can continue the communication with the BS. The second set of conditions may include, but is not limited to, the case where the first set of conditions are not met, or the UE fails to receive or decode using the RX beam(s) previously used. The BS uses the previously used good DL TX beam(s) to communicate to the UE.

Upon waking up from sleep mode, if a third set of conditions is met, training for both the RX beams and TX beams is performed. The training can use certain signals, such as the synchronization signal, reference signal, and broadcast signal. Through training, the UE can determine good DL RX beams and DL TX beams. Then the UE can use procedures similar to random access to re-enter the data communication state, e.g., by feeding back the UE's preferred DL TX beams on the random access channel (RACH), and then the BS can transmit signals over the UE's preferred DL TX beams. The third set of conditions may include the case that both the first set and the second set of conditions are not met, or the UE does not determine any good DL RX beam(s) to receive the previously used good DL TX beam(s), or that the UE fails to receive or decode using the previously used RX beam(s), or the UE fails to receive or decode using the RX beams after the beam training.

The aforementioned first set of conditions can include, e.g., the sleeping time (or the inactive duration) of the UE falls within a first range of inactive duration, or the UE has a velocity that falls within a first velocity range. The first range of inactive duration may be related to the first velocity range.

The aforementioned second set of conditions can include, e.g., the sleeping time (or the inactive duration) of the UE falls within a second range of inactive duration, or the UE has a velocity that falls within a second velocity range. The second range of inactive duration may be related to the second velocity range. For the same velocity range, the inactive duration in the first range of inactive duration may be shorter than the inactive duration in the second range of inactive duration.

The aforementioned third set of conditions can include, e.g., that the sleeping time (or the inactive duration) of the UE falls within a third range of inactive duration, or the UE has a velocity that falls within a third velocity range. The third range of inactive duration may be related to the third velocity range. For the same velocity range, the inactive duration in the first and second ranges of inactive duration may be shorter than the inactive duration in the third range of inactive duration.

Prior to the scheduled wake up time in the DRX mode, the UE can perform beam training and prepare for a possible downlink reception starting at the scheduled time.

Prior to the scheduled wake up time, the UE can perform beam training for the previously used downlink beam(s).

In DRX, the UE can wake up when a sync or BCH channel arrives if certain conditions are met, such as the sleep time is longer than a threshold. The threshold may be different for different velocities of the UE.

The beam training can be performed at the beginning of the subframe. If the reference signal is used for the UE to perform RX beam training when it wakes up, the reference signal may be longer in the time domain than a regular reference signal not used for UE RX beam training.

In addition to the regular DL control channel used by the connected mode UEs, an additional DL channel may be introduced specifically for UEs coming out of sleep mode that are in need of RX training. The UE can first perform the RX beam training. Then the UE can use the trained RX beam(s) or good RX beam(s) to receive the PDCCH channel at a later time in the same subframe.

Per RF-chain DRX: Rather than putting an entire device in DRX mode, it is possible to put a specific chain in DRX mode.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for supporting discontinuous reception (DRX) by a user equipment (UE) in a wireless network, the method comprising:
   waking up at a wake up time associated with a beginning of a DRX cycle, the DRX cycle comprising a plurality of subframes;
   determining, as a function of one of a sleeping duration time and a velocity of the UE, whether to perform receive beam training before a beginning of a time period for downlink communication; and
   receiving data during the time period for downlink communication, through either a previous receive beam or a newly trained receive beam depending on the determination.

2. The method of claim 1, wherein the beginning of the DRX cycle coincides with the beginning of the time period for downlink communication, and the wake up time is prior to the beginning of the DRX cycle, the method further comprising:
   performing receive beam training prior to the beginning of the DRX cycle.

3. The method of claim 1, wherein
the beginning of the DRX cycle coincides with the wake up time,
a time duration between the wake up time and a beginning of the time period for downlink communication depends on whether a first predetermined condition is met, and
the first predetermination condition is that one of the sleeping duration time and the velocity is within a respective first range.

4. The method of claim 3, wherein, after waking up:
when the first predetermined condition is met, using the previous receive beam pattern for the downlink communication,
when the first predetermined condition is not met but a second predetermined condition different than the first predetermined condition is met, performing receive beam training before the downlink communication and using a previous transmit beam for the downlink communication,
when neither the first predetermined condition nor the second predetermined condition are met, performing both receive beam training and transmit beam training before the downlink communication, and
wherein the second predetermined condition is that one of the sleeping duration time and the velocity is within a respective second range, the respective first range being shorter than the second respective range.

5. The method of claim 1, wherein each subframe in the DRX cycle comprises a first downlink channel portion configured for receive beam training and a second downlink control portion configured for a physical downlink control channel (PDCCH).

6. An apparatus for use in a mobile station configured to support discontinuous reception (DRX) in a wireless network, the apparatus comprising:
a processor coupled to at least one antenna, the processor configured to:
wake up at a wake up time associated with a beginning of a DRX cycle, the DRX cycle comprising a plurality of subframes,
determine, as a function of either a sleeping duration time or a velocity of the UE, whether to perform receive beam training before a beginning of a time period for downlink communication, and
receive data during the time period for downlink communication through one of a previous receive beam and a newly trained receive beam depending on the determination.

7. The apparatus of claim 6, wherein the beginning of the DRX cycle coincides with the beginning of the time period for downlink communication and the processor is configured to wake up and perform receive beam training prior to the beginning of the DRX cycle.

8. The apparatus of claim 6, wherein
the beginning of the DRX cycle coincides with the wake up time,
a time duration between the wake up time and a beginning of the time period for downlink communication depends on whether a first predetermined condition is met, and
wherein the first predetermination condition is that one of the sleeping duration time and the velocity is within a respective first range.

9. The apparatus of claim 8, wherein, after the UE wakes up:
when the first predetermined condition is met, the UE is configured to use the previous receive beam pattern for the downlink communication,
when the first predetermined condition is not met but a second predetermined condition different than the first predetermined condition is met, the UE is configured to perform receive beam training before the downlink communication and use a previous transmit beam for the downlink communication, and
when neither the first predetermined condition nor the second predetermined condition are met, the UE is configured to perform both receive beam training and transmit beam training before the downlink communication,
wherein the second determination condition is that either the sleeping duration time or the velocity is within a respective second range, the respective first range being shorter than the second respective range.

10. The apparatus of claim 6, wherein each subframe in the DRX cycle comprises a first downlink channel portion configured for receive beam training and a second downlink channel portion configured for a physical downlink control channel (PDCCH).

11. A method for supporting discontinuous reception (DRX) by a base station configured for communication with a user equipment (UE) in a wireless network, the method comprising:
instructing the UE to wake up at a wake up time associated with a beginning of a DRX cycle, the DRX cycle comprising a plurality of subframes;
instructing the UE to determine whether to perform receive beam training before a beginning of a time period for downlink communication as a function of either a sleeping duration time or a velocity of the UE; and
transmitting data to the UE during the time period for downlink communication, through either a previous transmit beam or a newly trained transmit beam depending on the determination.

12. The method of claim 11, wherein the beginning of the DRX cycle coincides with the beginning of the time period for downlink communication, and the wake up time is prior to the beginning of the DRX cycle, the method further comprising:
instructing the UE to perform receive beam training prior to the beginning of the DRX cycle.

13. The method of claim 11, wherein the beginning of the DRX cycle coincides with the wake up time, and a time duration between the wake up time and a beginning of the time period for downlink communication depends on whether a first predetermined condition is met,
wherein the first predeteimination condition is that either the sleeping duration time or the velocity is within a respective first range.

14. The method of claim 13, wherein, after the UE wakes up:
when the first predetermined condition is met, instructing the UE to use the previous receive beam pattern for downlink communication,
when the first predetermined condition is not met but a second predetermined condition different than the first predetermined condition is met, instructing the UE to perform receive beam training before the downlink communication and use a previous transmit beam for the downlink communication,
when neither the first predetermined condition nor the second predetermined condition are met, instructing the UE to perform both receive beam training and transmit beam training before the downlink communication, and
the second determination condition is that either the sleeping duration time or the velocity is within a respective second range, the respective first range being shorter than the second respective range.

15. The method of claim 11, wherein each subframe in the DRX cycle comprises a first downlink channel portion configured for receive beam training and a second downlink channel portion configured for a physical downlink control channel (PDCCH).

16. An apparatus for use in a base station configured for communication with a user equipment (UE) in a wireless network, the apparatus configured to support discontinuous receive (DRX), the apparatus comprising:
a processor coupled to at least one antenna, the processor configured to:
instruct the UE to wake up at a wake up time associated with a beginning of a DRX cycle, the DRX cycle comprising a plurality of subframes,
instruct the UE to determine, as a function of either a sleeping duration time or a velocity of the UE, whether to perform receive beam training before a beginning of a time period for downlink communication, and
transmit data to the UE during the time period for downlink communication through one of a previous receive beam and a newly trained receive beam depending on the determination.

17. The apparatus of claim 16, wherein the beginning of the DRX cycle coincides with the beginning of the time period for downlink communication and the base station instructs the UE to wake up and perform receive beam training prior to the beginning of the DRX cycle.

18. The apparatus of claim 16, wherein
the beginning of the DRX cycle coincides with the wake up time, and
a time duration between the wake up time and a beginning of the time period for downlink communication depends on whether a first predetermined condition is met, and
the first predetermination condition is that one of the sleeping duration time and the velocity is within a respective first range.

19. The apparatus of claim 18, wherein, after the UE wakes up:
when the first predetermined condition is met, the base station instructs the UE to use the previous receive beam pattern for downlink communication,
when the first predetermined condition is not met but a second predetermined condition different than the first predetermined condition is met, the base station instructs the UE to perform receive beam training before continuing downlink communication and use a previous transmit beam for the downlink communication,
when neither the first predetermined condition nor the second predetermined condition are met, the base station instructs the UE to perform both receive beam training and transmit beam training before continuing downlink communication, and
the second determination condition is that either the sleeping duration time or the velocity is within a respective second range, the respective first range being shorter than the second respective range.

20. The apparatus of claim 16, wherein each subframe in the DRX cycle comprises a first downlink channel portion configured for receive beam training and a second downlink channel portion configured for a physical downlink control channel (PDCCH).

* * * * *